US011220022B2

(12) United States Patent
Kobayashi et al.

(10) Patent No.: US 11,220,022 B2
(45) Date of Patent: *Jan. 11, 2022

(54) EXTRUDER SCREW HAVING PATHS WITHIN THE SCREW, EXTRUDER, AND EXTRUSION METHOD

(71) Applicants: Toshiba Kikai Kabushiki Kaisha, Tokyo (JP); HSP Technologies Inc., Tsukuba (JP)

(72) Inventors: Akiyoshi Kobayashi, Fuji (JP); Shigeyuki Fujii, Numazu (JP); Takafumi Sameshima, Mishima (JP); Hiroshi Shimizu, Tsukuba (JP)

(73) Assignees: Shibaura Machine Co., Ltd., Tokyo (JP); HSP Technologies Inc., Tsukuba (JP)

( * ) Notice: Subject to any disclaimer, the term of this patent is extended or adjusted under 35 U.S.C. 154(b) by 704 days.

This patent is subject to a terminal disclaimer.

(21) Appl. No.: 15/221,293

(22) Filed: Jul. 27, 2016

(65) Prior Publication Data

US 2016/0332332 A1 Nov. 17, 2016

Related U.S. Application Data

(63) Continuation of application No. PCT/JP2015/060641, filed on Apr. 3, 2015.

(30) Foreign Application Priority Data

Apr. 24, 2014 (JP) .............................. JP2014-090468
Apr. 1, 2015 (JP) .............................. JP2015-075276

(51) Int. Cl.
*B29B 7/42* (2006.01)
*B29C 48/54* (2019.01)
(Continued)

(52) U.S. Cl.
CPC ................ *B29B 7/426* (2013.01); *B29B 7/42* (2013.01); *B29B 7/422* (2013.01); *B29B 7/429* (2013.01);
(Continued)

(58) Field of Classification Search
CPC B29B 7/489; B29B 7/847; B29B 7/82; B29B 7/90; B29B 7/845; B29B 7/42;
(Continued)

(56) References Cited

U.S. PATENT DOCUMENTS 3,305,894 A 2/1967 Gerhard et al.
3,371,379 A * 3/1968 Reifenhauser ...... B29C 44/0492
159/2.2

(Continued)

FOREIGN PATENT DOCUMENTS

CN 87102748 11/1987
CN 1382573 12/2002
(Continued)

OTHER PUBLICATIONS

Chinese Office Action (with English Translation) issued in Chinese Application No. 201580007088.2 dated Mar. 3, 2017.
(Continued)

*Primary Examiner* — Charles Cooley
(74) *Attorney, Agent, or Firm* — DLA Piper LLP US

(57) ABSTRACT

An extruder screw conveying raw materials while kneading them includes a screw main body, conveyance portions, barrier portions, and paths. The conveyance portions convey the raw materials in an axial direction. The paths each include an entrance and an exit. The raw materials, the conveyance of which is limited by the barrier portions, flow in from the entrance. The raw materials flowing in from the entrance flow through the paths in an opposite direction to a conveyance direction. The exit is opened in the outer (Continued)

circumferential surface of the screw main body at a position outside the conveyance portions in which the entrance is opened.

9 Claims, 15 Drawing Sheets

(51) Int. Cl.
| | | |
|---|---|---|
| B29C 48/55 | (2019.01) | |
| B29C 48/535 | (2019.01) | |
| B29B 7/82 | (2006.01) | |
| B29B 7/84 | (2006.01) | |
| B29B 7/74 | (2006.01) | |
| B29C 48/80 | (2019.01) | |
| B29C 48/625 | (2019.01) | |
| B29C 48/385 | (2019.01) | |
| B29B 7/48 | (2006.01) | |
| B29C 48/51 | (2019.01) | |
| B29C 48/40 | (2019.01) | |
| B29B 7/72 | (2006.01) | |
| B29C 48/72 | (2019.01) | |
| B29C 48/82 | (2019.01) | |

(52) U.S. Cl.
CPC .............. *B29B 7/483* (2013.01); *B29B 7/487* (2013.01); *B29B 7/7461* (2013.01); *B29B 7/7485* (2013.01); *B29B 7/823* (2013.01); *B29B 7/845* (2013.01); *B29C 48/385* (2019.02); *B29C 48/51* (2019.02); *B29C 48/535* (2019.02); *B29C 48/54* (2019.02); *B29C 48/55* (2019.02); *B29C 48/625* (2019.02); *B29C 48/802* (2019.02); *B29B 7/726* (2013.01); *B29C 48/402* (2019.02); *B29C 48/72* (2019.02); *B29C 48/82* (2019.02)

(58) Field of Classification Search
CPC ....... B29B 7/421; B29B 7/823; B29B 7/7485; B29B 7/7461; B29B 7/429; B29B 7/482; B29B 7/422; B29B 7/726; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29K 2105/251; B29K 2023/12; B29K 2509/00
USPC ................................ 425/200–209; 366/79–91
See application file for complete search history.

(56) References Cited

U.S. PATENT DOCUMENTS

| | | | | |
|---|---|---|---|---|
| 3,503,944 A * | 3/1970 | Heinrich | ............ | B29C 47/1063 422/135 |
| 3,712,594 A * | 1/1973 | Schippers | ............... | B29C 47/60 159/2.2 |
| 3,746,318 A * | 7/1973 | Schippers | ................. | B29B 7/42 366/79 |
| 3,799,234 A | 3/1974 | Skidmore | | |
| 3,924,842 A * | 12/1975 | Klein | ...................... | B29C 47/38 366/295 |
| 3,963,558 A | 6/1976 | Skidmore | | |
| 3,999,921 A * | 12/1976 | Thor | ....................... | B29B 7/42 425/208 |
| 4,169,679 A | 10/1979 | Miller et al. | | |
| 4,290,702 A * | 9/1981 | Klein | ...................... | B29C 45/50 366/293 |
| 4,302,409 A | 11/1981 | Miller et al. | | |
| 4,329,313 A | 5/1982 | Miller et al. | | |
| 4,387,997 A * | 6/1983 | Klein | ...................... | B29C 45/50 366/295 |
| 4,423,960 A | 1/1984 | Anders | | |
| 4,472,059 A * | 9/1984 | Klein | ...................... | B29C 47/38 366/293 |
| 4,637,790 A * | 1/1987 | Klein | .................. | B29C 47/6006 366/293 |
| 4,802,140 A * | 1/1989 | Dowling | ................... | B29B 7/42 366/144 |
| 4,902,455 A | 2/1990 | Wobbe | | |
| 4,959,186 A | 9/1990 | Dollhopf et al. | | |
| 4,983,114 A | 1/1991 | Hauck | | |
| 5,102,594 A | 4/1992 | Burlet et al. | | |
| 5,358,681 A | 10/1994 | Jerman et al. | | |
| 5,499,870 A | 3/1996 | Rockstedt | | |
| 5,804,111 A | 9/1998 | Kobayashi et al. | | |
| 6,024,479 A | 2/2000 | Haring | | |
| 8,048,948 B2 * | 11/2011 | Shimizu | .................... | B29B 7/90 524/442 |
| 8,975,336 B2 * | 3/2015 | Shimizu | ................... | B29B 7/125 525/185 |
| 9,199,393 B2 * | 12/2015 | Shimizu | .................... | B29B 7/14 |
| 10,967,554 B2 * | 4/2021 | Kobayashi | ............... | B29C 48/51 |
| 11,072,104 B2 * | 7/2021 | Kobayashi | ............... | B29C 48/51 |
| 2002/0186612 A1 | 12/2002 | Murakami et al. | | |
| 2004/0222543 A1 | 11/2004 | Innerebner et al. | | |
| 2004/0238990 A1 | 12/2004 | Hermann et al. | | |
| 2005/0087904 A1 | 4/2005 | Bryan | | |
| 2006/0108706 A1 | 5/2006 | Galimberti | | |
| 2016/0303766 A1 | 6/2016 | Kobayashi | | |
| 2016/0332331 A1 * | 11/2016 | Kobayashi | ............ | B29C 48/395 |
| 2016/0332332 A1 * | 11/2016 | Kobayashi | ................ | B29B 7/42 |
| 2017/0021547 A1 * | 1/2017 | Kobayashi | ............... | B29B 7/421 |
| 2017/0050366 A1 * | 2/2017 | Kobayashi | ............ | B29C 48/385 |
| 2017/0050367 A1 * | 2/2017 | Kobayashi | .......... | B29C 47/6056 |
| 2017/0113394 A1 * | 4/2017 | Kobayashi | ............... | B29C 47/64 |
| 2017/0225360 A1 * | 8/2017 | Kobayashi | ............... | B29C 48/76 |
| 2017/0225379 A1 * | 8/2017 | Kobayashi | ............ | B29C 48/505 |
| 2018/0093233 A1 * | 4/2018 | Kobayashi | ............... | B29B 7/421 |
| 2018/0093234 A1 * | 4/2018 | Kobayashi | ................ | B29B 7/42 |
| 2019/0352472 A1 * | 11/2019 | Sameshima | ............... | H01B 1/24 |
| 2020/0282622 A1 * | 9/2020 | Ougier | .................... | B29C 48/92 |
| 2021/0154906 A1 * | 5/2021 | Kobayashi | ............... | B29C 48/51 |

FOREIGN PATENT DOCUMENTS

| | | | |
|---|---|---|---|
| CN | 101973121 | | 2/2011 |
| CN | 103068540 | | 4/2013 |
| DE | 2040919 A | | 2/1972 |
| DE | 2454785 | * | 5/1976 |
| DE | 2454785 A | | 5/1976 |
| DE | 25 48 490 | | 5/1977 |
| DE | 694 17 466 | | 12/1999 |
| EP | 0 688 600 | | 12/1995 |
| EP | 2 578 378 | | 4/2013 |
| EP | 3650196 A1 | * | 5/2020 |
| GB | 1175127 | | 12/1969 |
| GB | 1 501 412 | | 2/1978 |
| JP | 48-61153 | | 8/1973 |
| JP | 50-143863 | | 11/1975 |
| JP | 52-72573 | | 5/1977 |
| JP | S52-72573 | | 5/1977 |
| JP | 56-37054 | | 8/1981 |
| JP | S57-034936 | | 2/1982 |
| JP | S57-41932 | | 3/1982 |
| JP | 57-107826 | | 7/1982 |
| JP | S57-163547 | | 10/1982 |
| JP | 58-25943 | | 2/1983 |
| JP | 59-184635 | | 10/1984 |
| JP | H01-320129 | | 12/1989 |
| JP | 5-220818 | | 8/1993 |
| JP | H06-170920 | | 6/1994 |
| JP | H07-88923 | | 4/1995 |
| JP | 7-227836 | | 8/1995 |
| JP | H09-504755 | | 5/1997 |
| JP | 2002-321214 | | 11/2002 |

(56) References Cited

FOREIGN PATENT DOCUMENTS

| | | |
|---|---|---|
| JP | 2004-529018 | 9/2004 |
| JP | 2005-169764 | 6/2005 |
| JP | 2005-313608 | 11/2005 |
| JP | 2008-302555 | 12/2008 |
| JP | 2009-045804 | 3/2009 |
| JP | 2010-069771 | 4/2010 |
| JP | 2010-105285 | 5/2010 |
| JP | 2010-137405 | 6/2010 |
| JP | 2011-020341 | 2/2011 |
| JP | 2011-046104 | 3/2011 |
| JP | 2011-083976 | 4/2011 |
| JP | 2011-116025 | 6/2011 |
| JP | 2012-051289 | 3/2012 |
| JP | 2013-071428 | 4/2013 |
| JP | 2013-123841 | 6/2013 |
| JP | 53-69614 | 12/2013 |
| JP | 2014-019045 | 2/2014 |
| KR | 2002-0082788 | 10/2002 |
| KR | 10-0401578 | 8/2004 |
| KR | 10-2010-0087738 | 8/2010 |
| SU | 889462 | 12/1981 |
| WO | WO 2010-061872 | 6/2010 |
| WO | WO 2012/029271 | 3/2012 |
| WO | WO 2012-029271 | 3/2012 |
| WO | 2013/133453 * | 9/2013 |
| WO | WO 2013/133453 | 9/2013 |
| WO | WO 2013-133453 | 9/2013 |
| WO | WO 2015/163197 | 10/2015 |
| WO | WO 2015/170617 | 11/2015 |
| WO | WO-2020025446 A1 * | 2/2020 ............. B29C 48/51 |

OTHER PUBLICATIONS

English Language Abstract and Machine Translation of JP 2010-0696771 published Apr. 2, 2010.
English Language (Machine) Translation of DE 2 548 490 published May 5, 1977.
International Search Report issued in International Application No. PCT/JP2016/062278 dated Jul. 12, 2016.
International Search Report issued in International Application No. PCT/JP2016/062279 dated Jul. 12, 2016.
Written Opinion issued in International Application No. PCT/JP2016/062278 dated Jul. 12, 2016.
Written Opinion issued in International Application No. PCT/JP2016/062279 dated Jul. 12, 2016.
Korean Office Action issued in KR 10-2016-7021148 dated Nov. 29, 2017.
English Language Abstract of JP 7-227836 published Aug. 29, 1995.
English Language Abstract of JP 2010-137405 published Jun. 24, 2010.
English Language Abstract of JP 2013-123841 published Jun. 24, 2013.
English Language Abstract of KR 10-2010-0087738 published Aug. 5, 2010.
U.S. Appl. No. 15/221,277 electronically captured on Feb. 23, 2018 (from Nov. 1, 2017 to present).
U.S. Appl. No. 15/795,534 electronically captured on Feb. 23, 2018.
U.S. Appl. No. 15/795,535 electronically captured on Feb. 23, 2018.
Chinese Office Action (with English Translation) issued in Chinese Application No. 201580007825.9 dated Mar. 24, 2017.
English Language Abstract and Machine Translation of CN 87102748 published Nov. 18, 1987.
International Search Report (with English Translation) issued in International Application No. PCT/JP2015/060641 dated May 26, 2015.
International Search Report (with English Translation) issued in International Application No. PCT/JP2015/061487 dated Jul. 7, 2015.
English Language Abstract and Machine Translation of WO 2010/061872 published Jun. 3, 2010.
English Language Abstract and Machine Translation of JP 2011-046104 published Mar. 10, 2011.
English Language Abstract and Machine Translation of JP 2012-051289 published Mar. 15, 2012.
English Language Abstract and Machine Translation of JP 2013-071428 published Apr. 22, 2013.
English Language Abstract and Machine Translation of WO 2012/029271 published Mar. 8, 2012.
English Language Abstract and Machine Translation of JP 2010-105285 published May 13, 2010.
English Language Abstract and Machine Translation of JP 2009-045804 published Mar. 5, 2009.
English Language Abstract of JP S57-41932 published Mar. 9, 1982.
English Language Abstract and Machine Translation of JP H07-88923 published Apr. 4, 1995.
Written Opinion (with English Translation) issued in International Application No. PCT/JP2015/060641 dated May 26, 2015.
Written Opinion (with English Translation) issued in International Application No. PCT/JP2015/061487 dated Jul. 7, 2015.
Taiwan Office Action (with English Translation) issued in Taiwan Application No. 104112230 dated Sep. 2, 2016.
Taiwan Office Action (with English Translation) issued in Taiwan Application No. 104112709 dated Sep. 2, 2016.
U.S. Appl. No. 15/221,277 electronically captured on Oct. 31, 2016.
U.S. Appl. No. 15/221,277 electronically captured on May 20, 2019 (from Feb. 22, 2019 to present).
Office Action in DE Application No. 112015001938.3 dated Jul. 26, 2019.
Office Action in CN Application No. 201680024052X dated Jul. 22, 2019.
U.S. Appl. No. 15/221,277 electronically captured on Oct. 21, 2019 (Jul. 22, 2019 to present).
Office Action in DE Application No. 11 2015 002 161.2 dated Aug. 8, 2019.
International Search Report (with English Translation) issued in PCT/JP2015/061874 dated Jul. 7, 2015.
Written Opinion (with English Translation) issued in PCT/JP2015/061874 dated Jul. 7, 2015.
International Preliminary Report on Patentability issued in PCT/JP2015/061874 dated Nov. 8, 2016.
International Search Report (with English Translation) issued in PCT/JP2015/062549 dated Jul. 21, 2015.
Written Opinion (with English Translation) issued in PCT/JP2015/062549 dated Jul. 21, 2015.
International Preliminary Report on Patentability issued in PCT/JP2015/062549 dated Nov. 8, 2016.
International Search Report (with English Translation) issued in PCT/JP2015/062566 dated Jul. 21, 2015.
Written Opinion (with English Translation) issued in PCT/JP2015/062566 dated Jul. 21, 2015.
International Preliminary Report on Patentability issued in PCT/JP2015/062566 dated Nov. 8, 2016 .
Taiwanese Office Action (with English Translation) issued in TW 104114405 dated Jun. 16, 2016.
Taiwanese Office Action (with English Translation) issued in TW 104114406 dated Jun. 16, 2016.
Chinese Office Action (with English Translation) issued in CN 2015-80005725.2 dated Apr. 24, 2017.
Korean Office Action issued in KR 10-20165-7019779 dated Nov. 27, 2017.
Chinese Office Action issued in CN 2015-80023951.3 dated Mar. 30, 2018.
Chinese Office Action issued in CN 2015-80024101.5 dated Apr. 2, 2018.
Xiaozheng, Geng "Plastics Mixing & Continuous Mixing Equipment", China Light Industry Press, pp. 349-353, Jan. 31, 2008.
Koreah Office Action issued in KR 2016-7033989 dated Jul. 16, 2018.
Korean Office Action issued in KR 2016-7033993 dated Aug. 2, 2018.
Japanese Office Action issued in JP Application No. 2015-082775 dated May 7, 2019.

(56) References Cited

OTHER PUBLICATIONS

Related U.S. Appl. No. 15/345,711 electronically captured on Nov. 11, 2019 from (Aug. 11, 2019 to Nov. 11, 2019).
Related U.S. Appl. No. 15/345,750 electronically captured on Nov. 11, 2019 (from Aug. 11, 2019 to Nov. 11, 2019).
Related U.S. Appl. No. 15/345,758 electronically captured on Nov. 11, 2019 (from Aug. 11, 2019 to Nov. 11, 2019).
U.S. Appl. No. 15/221,277 electronically captured on Nov. 11, 2019, 2019 (from Aug. 11, 2019 to Nov. 11, 2019).
U.S. Appl. No. 15/795,534 electronically captured on Nov. 11, 2019 (from Aug. 11 2019 to Nov. 11, 2019).
U.S. Appl. No. 15/795,535 electronically captured on Nov. 11, 2019 (from Aug. 11, 2019 to Nov. 11, 2019).
U.S. Appl. No. 15/221,277 electronically captured on Feb. 20, 2020.
U.S. Appl. No. 15/345,750 electronically captured on Feb. 20, 2020.
U.S. Appl. No. 15/345,758 electronically captured on Feb. 20, 2020.
U.S. Appl. No. 15/345,711 electronically captured on Feb. 20, 2020.
German Office Action in DE Application No. 11 2015 002 164.7, dated Jun. 23, 2020.
U.S. Appl. No. 15/221,277 electronically captured on Sep. 16, 2020 (Aug. 20, 2020 to Present).
U.S. Appl. No. 15/345,750 electronically captured on Sep. 16, 2020 (Aug. 20, 2020 to Present).
U.S. Appl. No. 15/345,711, filed Nov. 8, 2015 electronically captured on Dec. 11, 2020 (Sep. 18, 2020 to Present).
U.S. Appl. No. 15/345,750, filed Nov. 8, 2016 electronically captured on Dec. 11, 2020 (Sep. 18, 2020 to Present).
U.S. Appl. No. 15/345,711 electronically captured on Aug. 19, 2020 (May 20, 2020-present).
U.S. Appl. No. 15/795,534 electronically captured on Aug. 19, 2020 (May 20, 2020-present).
U.S. Appl. No. 15/795,535 electronically captured on Aug. 19, 2020 (May 20, 2020-present).
U.S. Appl. No. 15/345,711 electronically captured on Jul. 27, 2021 (May 24, 2021 to present).
U.S. Appl. No. 15/345,758 electronically captured on Jul. 28, 2021 (Apr. 28, 2020 to Present).
U.S. Appl. No. 17/386,635 electronically captured on Jul. 28, 2021 (Jul. 28, 2021 to Present).
U.S. Appl. No. 15/221,277, 2016-0332331 A1, filed Jul. 27, 2016, Pending.
U.S. Appl. No. 15/345,750, 2017-0113394 A1, filed Nov. 8, 2016, Pending.
U.S. Appl. No. 15/345,711, 2017-0050366 A1, filed Nov. 8, 2016, Pending.
U.S. Appl. No. 15/345,758, 2017-0050367 A1, filed Nov. 8, 2016, Pending.
U.S. Appl. No. 15/795,534, 2018-0093233 A1, filed Oct. 27, 2017, Pending.
U.S. Appl. No. 15/795,535, 2018-0093234 A1, filed Oct. 27, 2017, Pending.
U.S. Appl. No. 17,166,781, filed Feb. 3, 2021, Pending.
U.S. Appl. No. 17,386,635, filed Jul. 28, 2021, Pending.
U.S. Appl. No. 15/221,277, filed Jul. 27, 2016 electronically captured on Feb. 24, 2021 (Dec. 23, 2020 to Present).
U.S. Appl. No. 15/345,750, filed Nov. 8, 2016 electronically captured on Feb. 24, 2021 (Dec. 23, 2020 to Present).
U.S. Appl. No. 15/795,534, filed Oct. 27, 2017 electronically captured on Feb. 24, 2021 (Dec. 23, 2020 to Present).
U.S. Appl. No. 15/795,535, filed Oct. 27, 2017 electronically captured on Feb. 24, 2021 (Dec. 23, 2020 to Present).
U.S. Appl. No. 15/345,758, filed Nov. 8, 2016 electronically captured on Feb. 24, 2021 (Dec. 23, 2020 to Present).
U.S. Appl. No. 17/166,781, filed Feb. 3, 2021 electronically captured on Feb. 24, 2021 (Dec. 23, 2020 to Present).
U.S. Appl. No. 15/221,277 dated Dec. 7, 2021 (Sep. 7, 2021 to present).
U.S. Appl. No. 15/345,711 dated Dec. 7, 2021 (Sep. 7, 2021 to present).
U.S. Appl. No. 15/795,534 dated Dec. 7, 2021 (Sep. 7, 2021 to present).
U.S. Appl. No. 15/795,535 dated Dec. 7, 2021 (Sep. 7, 2021 to present).

\* cited by examiner

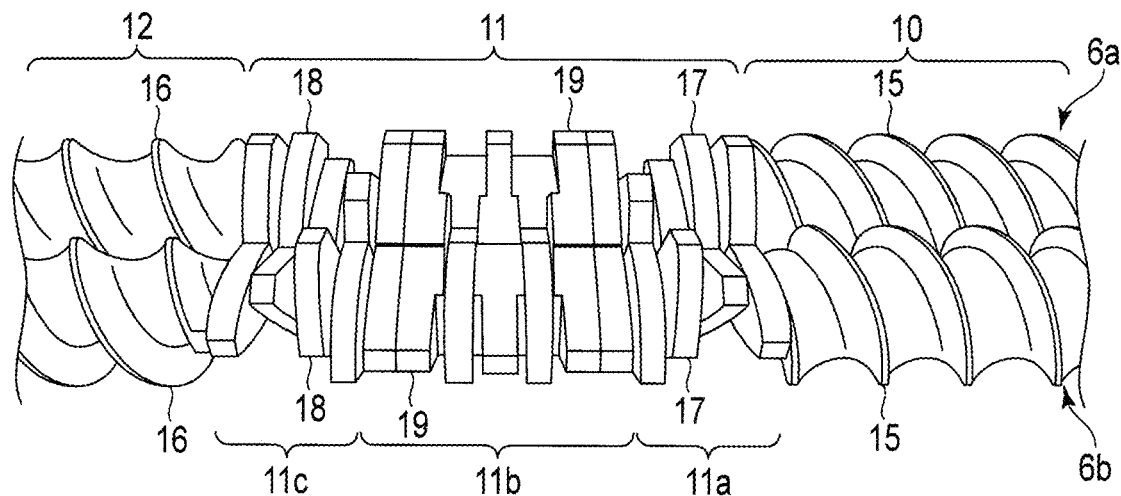
F I G. 3
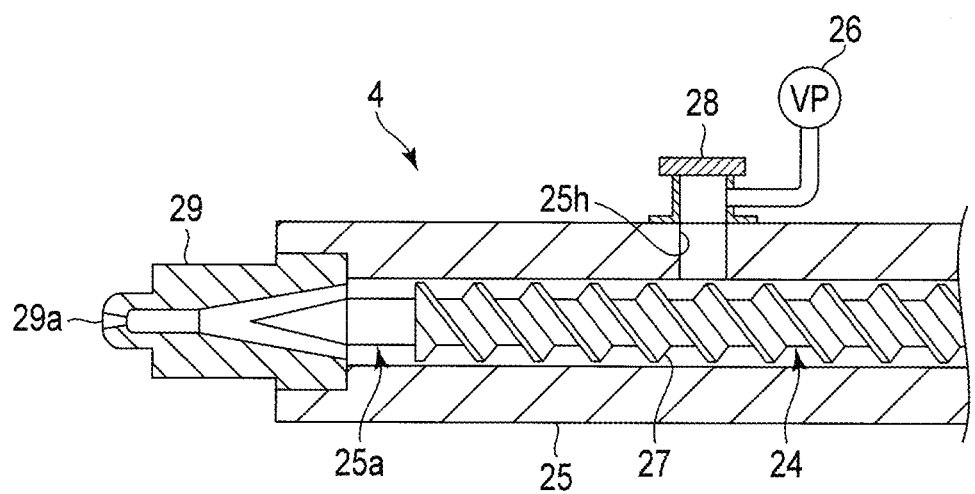
F I G. 4

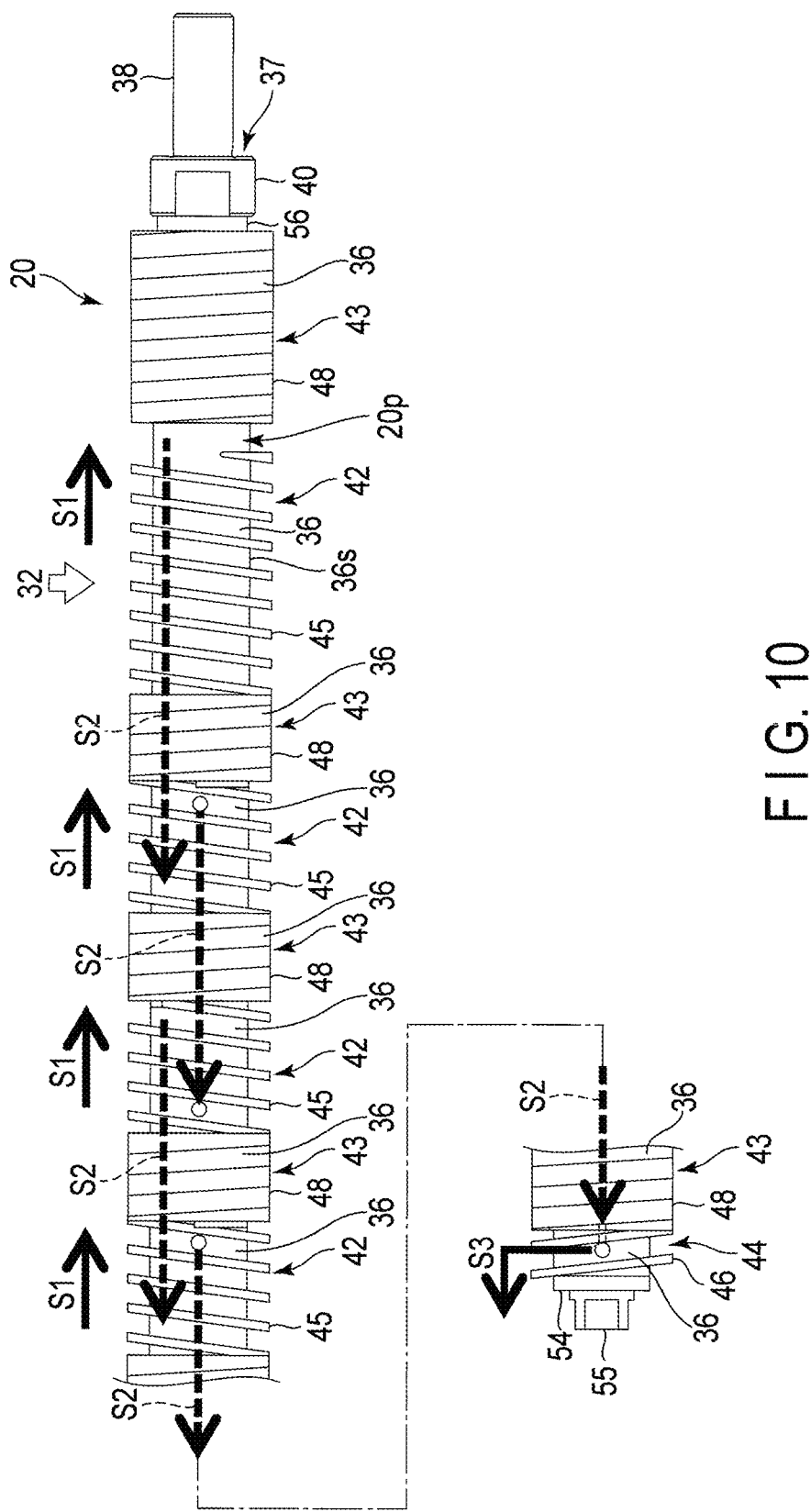
F I G. 10

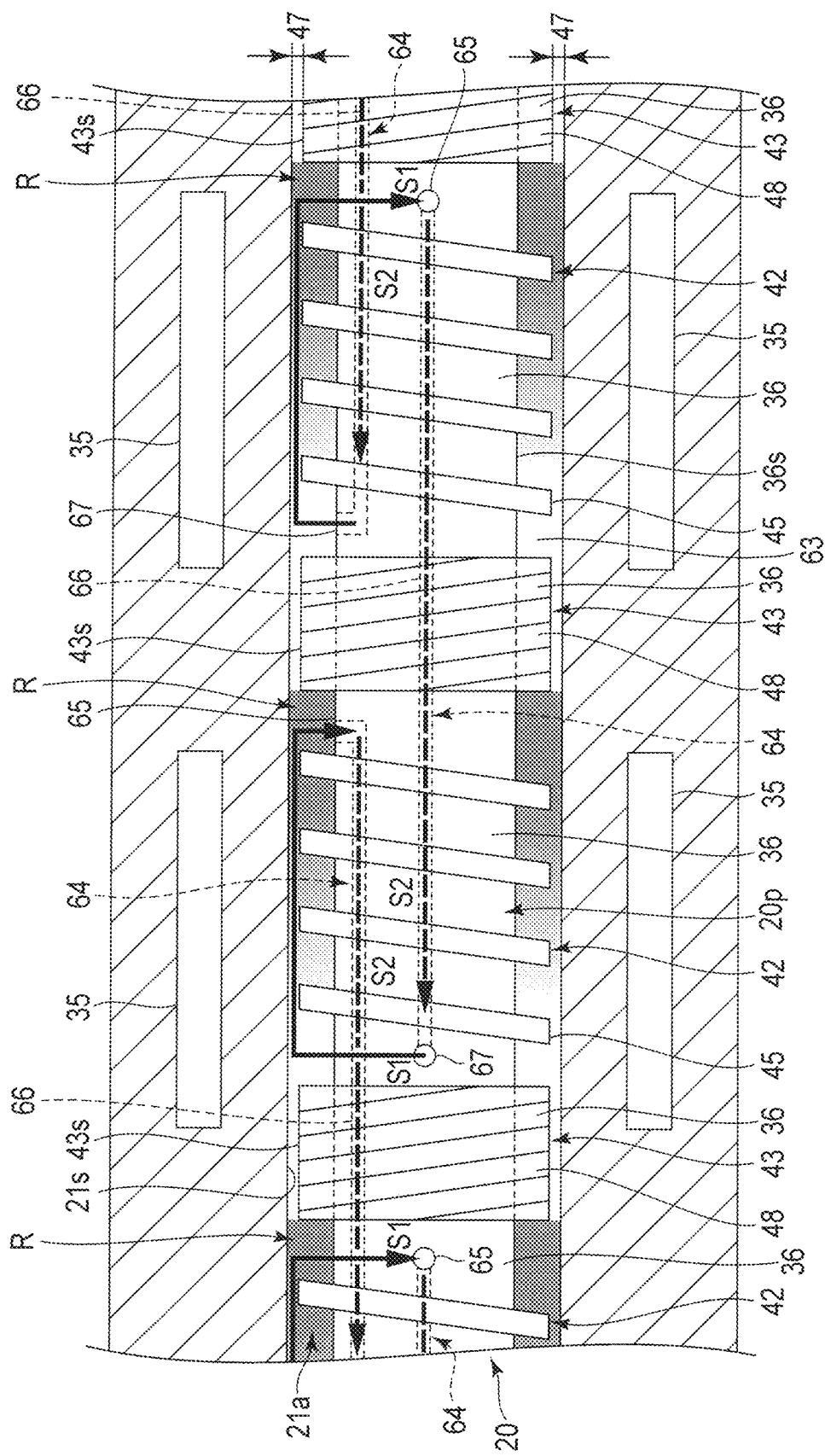
F I G. 11

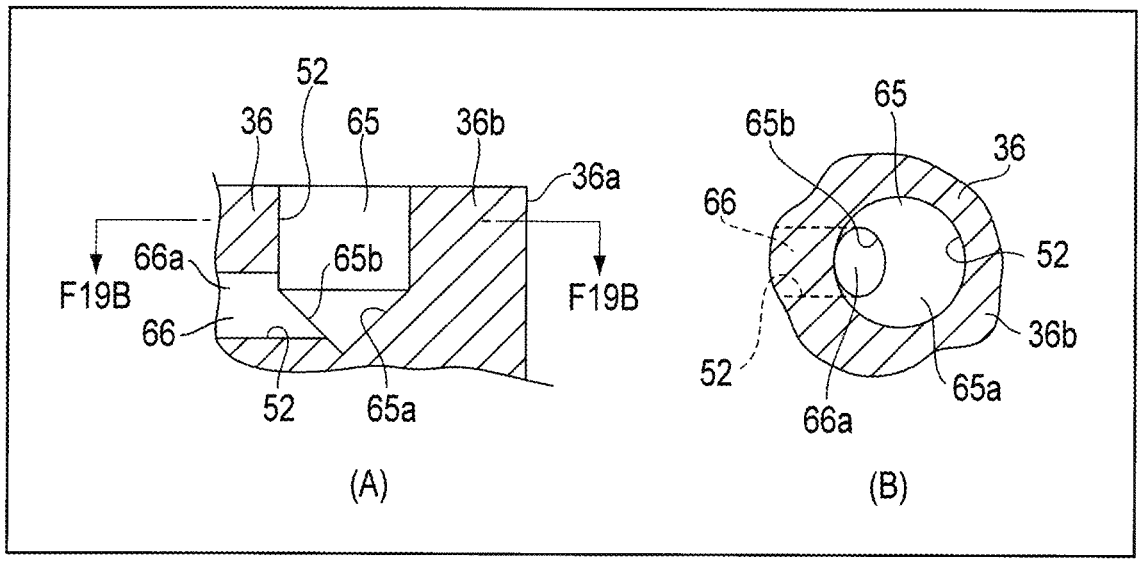
F I G. 19
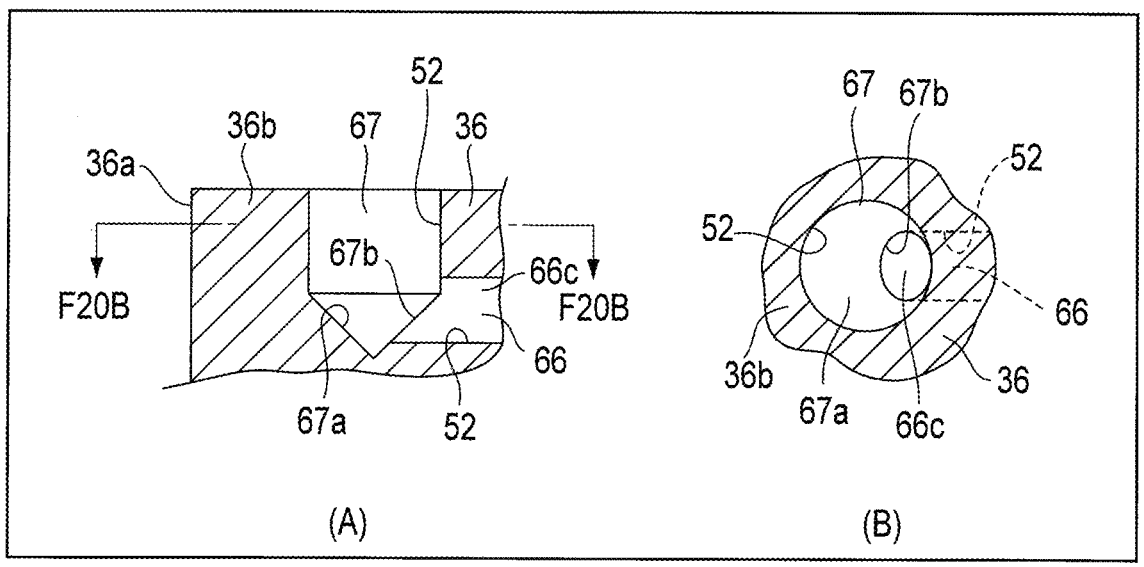
F I G. 20

EXTRUDER SCREW HAVING PATHS WITHIN THE SCREW, EXTRUDER, AND EXTRUSION METHOD

CROSS REFERENCE TO RELATED APPLICATIONS

This application is a Continuation Application of PCT Application No. PCT/JP2015/060641, filed Apr. 3, 2015 and based upon and claiming the benefit of priority from prior Japanese Patent Applications No. 2014-090468, filed Apr. 24, 2014; and No. 2015-075276, filed Apr. 1, 2015, the entire contents of all of which are incorporated herein by reference.

BACKGROUND OF THE INVENTION

1. Field of the Invention

The present invention relates to an extruder screw, an extruder, and an extrusion method for producing kneaded materials by kneading continuously supplied raw materials, and continuously extruding the kneaded materials.

2. Description of the Related Art

As a technique of kneading raw materials, Patent Literature 1 discloses a batch kneading apparatus capable of dispersing raw materials at a nanolevel and kneading them without using additives. The batch kneading apparatus comprises a feedback-type screw and a cylinder in which the screw is rotatably inserted. The kneading apparatus repeats a circulation process of feeding raw materials supplied to the cylinder from a rear end of the screw to a gap in a front end, and then, returning them from the gap to the rear end of the screw.

In the circulation process, "shearing action", caused by a difference in speed between the rotating screw and an inner surface of the cylinder, is imparted to the raw materials while they are being fed from the rear end to the front end of the screw; and "extension action", caused when they pass from a wide place to a narrow place, is imparted to them while they are being fed from the gap in the front end of the screw along a hole of the screw.

At this time, in the cylinder, the raw materials are in a state of repeating a shearing flow and an extension flow. Predetermined kneaded materials are produced in accordance with a time for which a shearing flow and an extension flow are repeated, that is, a circulation time.

CITATION LIST

Patent Literature

Patent Literature 1
WO 2010/061872 A1

BRIEF SUMMARY OF THE INVENTION

Technical Problem

Incidentally, the apparatus according to Patent Literature 1 cannot perform the next kneading unless a particular amount of raw materials has been kneaded in the cylinder and all the kneaded materials have been discharged from the cylinder. In other words, kneaded materials cannot be continuously discharged from the cylinder while the raw materials are being circulated in an enclosed space in the cylinder. Therefore, there has been a certain limit on improvements in the productivity of kneaded materials.

In this case, the same amount of kneaded materials as in the case where kneaded materials are continuously produced can be apparently obtained by preparing a plurality of apparatuses identical to that of Patent Literature 1 and staggering the times when they perform a circulation process. However, additional costs become necessary to invest in facilities for the plurality of apparatuses and secure a space for installation, etc. As a result, the productivity of kneaded materials cannot be improved.

Therefore, an object of the present invention is to provide an extrusion technique of enabling kneaded materials to be continuously discharged from a cylinder, thereby significantly improving the productivity of the kneaded materials.

Moreover, to obtain kneaded materials dispersed at a nanolevel, it is required that the degree of kneading of raw materials be improved. Such a requirement can be fulfilled by increasing the number of times shearing action and extension action are imparted to raw materials. The number of times shearing action and extension action are imparted can be increased by, for example, providing portions which impart shearing action and portions which impart extension action along an axial direction of a screw. However, in such a structure, the screw is elongated.

Moreover, the degree of kneading of raw materials can be set in advance on the basis of the above-described number of times shearing action and extension action are imparted. However, in the apparatus of Patent Literature 1, the number of times raw materials circulates in the cylinder cannot be counted. Thus, the above-described number of times shearing action and extension action are imparted cannot be set in advance.

Therefore, another object of the present invention is to provide an extrusion technique of enabling the number of times shearing action and extension action are imparted to raw materials to be set in advance, thereby significantly improving the degree of kneading of the raw materials without elongating a screw.

Solution to Problem

In general, according to one embodiment, an extruder screw conveying raw materials while kneading them includes a screw main body, conveyance portions, barrier portions, and paths. The conveyance portions convey the raw materials in an axial direction. The paths each include an entrance and an exit. The raw materials, the conveyance of which is limited by the barrier portions, flow in from the entrance. The raw materials flowing in from the entrance flow through the paths in an opposite direction to a conveyance direction. The exit is opened in the outer circumferential surface of the screw main body at a position outside the conveyance portions in which the entrance is opened.

Advantageous Effects of Invention

According to the present invention, the productivity of kneaded materials can be significantly improved by enabling the kneaded materials to be continuously discharged from a cylinder.

According to the present invention, the degree of kneading of raw materials can be significantly improved without elongating a screw by enabling the number of times shearing action and extension action are imparted to the raw materials to be set in advance.

BRIEF DESCRIPTION OF THE SEVERAL VIEWS OF THE DRAWING

FIG. 3 is a perspective view schematically showing a structure of two screws incorporated in the first extruder.

FIG. 4 is a transverse sectional view of a third extruder.

FIG. 10 is a diagram schematically showing a flowing state of raw materials produced by the extruder screw.

FIG. 11 is an expanded sectional view showing a part of the flowing state of raw materials in a cylinder of the second extruder.

FIG. 19 (A) is an expanded sectional view showing a structure of an entrance portion of the path in a modification of the present invention, and FIG. 19 (B) is a sectional view along line F19B-F19B of FIG. 19 (A).

FIG. 20 (A) is an expanded sectional view showing a structure of an exit portion of the path in the modification of the present invention, and FIG. 20 (B) is a sectional view along line F20B-F20B of FIG. 20 (A).

DETAILED DESCRIPTION OF THE INVENTION

One of the embodiments of the present invention will be described hereinafter with reference to the accompanying drawings.

Figure 1:
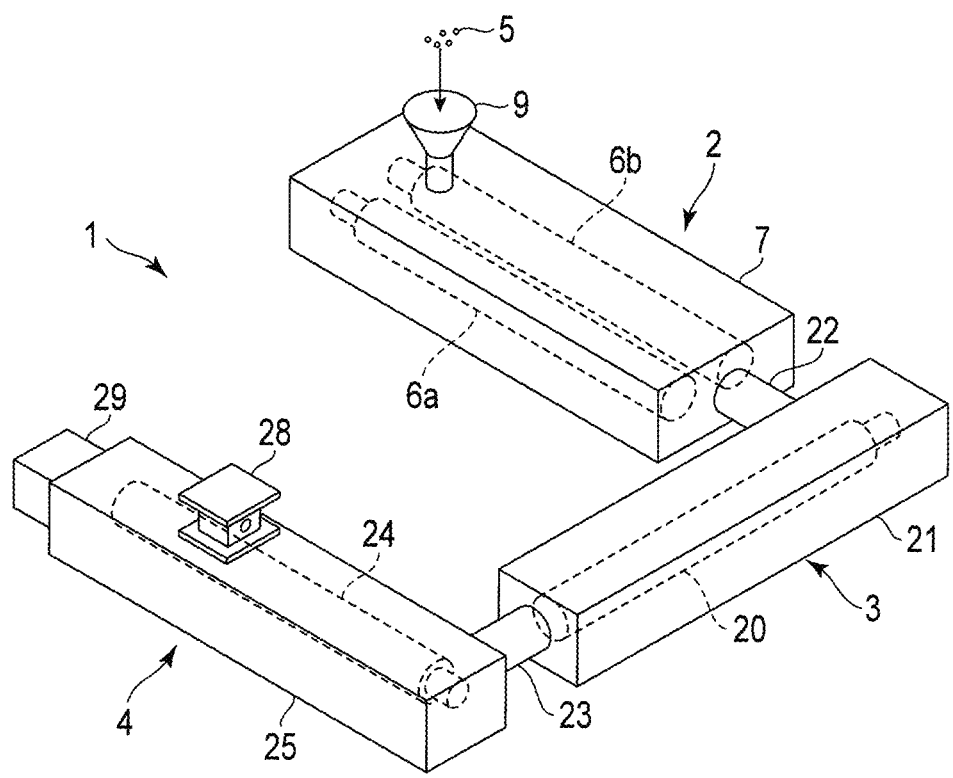
FIG. 1 is a perspective view schematically showing a whole structure of a continuous high shearing processing apparatus according to one of the embodiments of the present invention.

FIG. 1 shows a structure of a continuous high shearing processing apparatus 1 according to the present embodiment. The high shearing processing apparatus 1 is formed by connecting a first extruder 2, a second extruder 3, and a third extruder 4 in series. The third extruder 4 is not absolutely necessary, and is incorporated into the continuous high shearing processing apparatus 1 depending on purposes.

The first extruder 2 melts materials 5 by preliminarily kneading them, and continuously supplies the thereby produced materials 5 in a melted state to the second extruder 3 as raw materials. The second extruder 3 imparts shearing action and extension action to the raw materials continuously supplied from the first extruder 2, and continuously extrudes the kneaded materials. The third extruder 4 draws and removes gaseous components included in the kneaded materials extruded from the second extruder 3, and discharges the kneaded materials, from which the gaseous components are drawn and removed, to the outside.

As the raw materials kneaded by the second extruder 3, not only melted and mixed raw materials of a polycarbonate (PC) resin and a polymethyl methacrylate (PMMA) resin, but also various raw materials such as raw materials of a thermoplastic resin in a melted state including carbon fibers, are applied.

[First Extruder 2]

Figure 2:
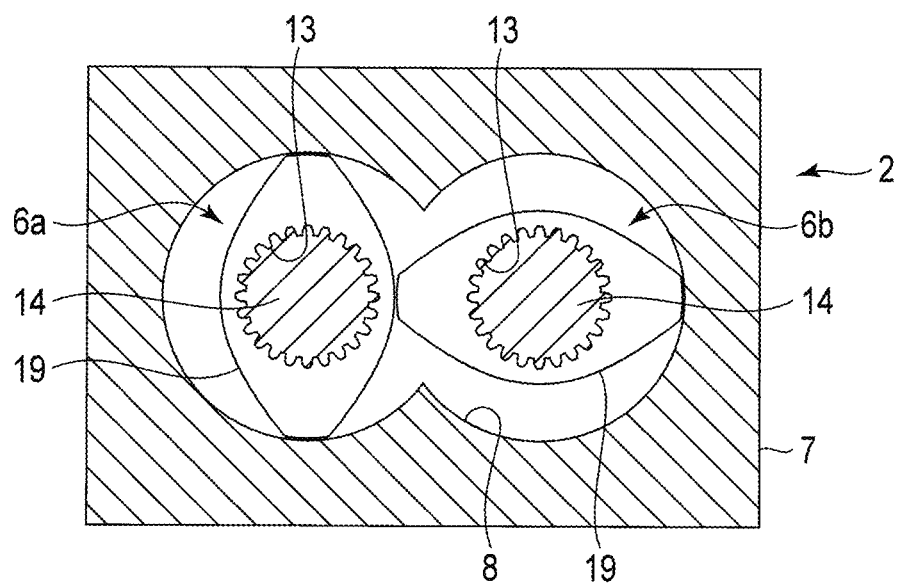
FIG. 2 is a longitudinal sectional view of a first extruder.

As shown in FIG. 2, the first extruder 2 is formed as a co-rotating twin-screw extruder, and comprises two screws 6a and 6b engaging with each other, and a barrel 7 in which the two screws 6a and 6b are rotatably accommodated. The two screws 6a and 6b are formed to extend parallel and straight, and can rotate in the same direction in a state of engaging with each other. The barrel 7 comprises an accommodation portion 8 in which the two screws 6a and 6b in a state of engaging with each other are rotatably accommodated, and a heater (not shown in the figures) for heating and melting the materials 5 introduced from an introduction portion 9 (see FIG. 1) into the accommodation portion 8.

As shown in FIG. 3, the two screws 6a and 6b can preliminarily knead the introduced materials 5 (see FIG. 1) while conveying them by rotating in the same direction in a state of engaging with each other. The two screws 6a and 6b in a state of engaging with each other comprise a feed portion 10, a kneading portion 11, and a pumping portion 12.

Spline holes 13 are formed in the central portions of the feed portion 10, the kneading portion 11, and the pumping portion 12. In the spline holes 13, spline axes 14 coupled to a rotating device (not shown in the figures), for example, a motor, are inserted. The feed portion 10, the kneading portion 11, and the pumping portion 12 can be rotated by rotating the spline axes 14. FIG. 2 shows the spline holes 13 formed in disks 19 of the kneading portion 11 of the two screws 6a and 6b as an example of the spline holes 13.

According to this structure, by rotating the two screws 6a and 6b in the same direction, the materials 5 introduced from the introduction portion 9 into the accommodation portion 8 are conveyed by the feed portion 10 and kneaded by the kneading portion 11, and then, conveyed by the pumping portion 12 and continuously supplied to the second extruder 3.

In the feed portion 10, the two screws 6a and 6b are each provided with a flight 15 which is spirally twisted in the opposite direction to the rotation direction of the screws 6a and 6b in the conveyance direction of the materials 5. The respective flights 15 engage with each other in a state of being out of phase by 90°. By rotating the two screws 6a and 6b in this state, the introduced materials 5 can be conveyed to the kneading portion 11.

In the pumping portion 12, the two screws 6a and 6b are each provided with a flight 16 which is spirally twisted in the opposite direction to the rotation direction of the screws 6a and 6b in the conveyance direction of the materials 5. The respective flights 16 engage with each other in a state of being out of phase by 90°. By rotating the two screws 6a and 6b in this state, the materials 5 kneaded by the kneading portion 11 can be conveyed.

In the kneading portion 11, the two screws 6a and 6b are each provided with a first disk area 11a, a second disk area 11b, and a third disk area 11c. The first disk area 11a is provided with disks 17, and the disks 17 are formed by making the adjacent disks 17 differ in phase in conformity with the spiral direction of the flights 15 of the feed portion 10. Similarly, the third disk area 11c is provided with disks 18, and the disks 18 are formed by making the adjacent disks 18 differ in phase in conformity with the spiral direction of the flights 16 of the pumping portion 12. In contrast, the second disk area 11b is provided with disks 19, and the disks 19 are formed by orthogonalizing the adjacent disks 19.

According to the above-described first extruder 2, by mixing the materials 5 introduced from the introduction portion 9 into the accommodation portion 8 while melting them by heating, the materials 5 can be produced as raw materials having flowability suitable to be kneaded by the second extruder 3. The melted and mixed raw materials are continuously extruded from the first extruder 2.

[Second Extruder 3]

As shown in FIG. 1, the second extruder 3 is formed as a single screw extruder, and comprises an extruder screw 20 and a barrel 21 comprising a cylinder 21a (see FIG. 5 and FIG. 6) in which the screw 20 is rotatably inserted. The raw materials continuously extruded from the first extruder 2 are continuously supplied to the second extruder 3 through a path portion 22. In the second extruder 3, shearing action and extension action are imparted to the raw materials, and thus, kneaded materials are continuously produced. The produced kneaded materials are continuously supplied to the third extruder 4 through a path portion 23. A specific structure of the second extruder 3 comprising the screw 20 will be described in detail later.

[Third Extruder 4]

As shown in FIG. 4, the third extruder 4 is formed as a single screw extruder, and comprises a vented screw 24 extending straight, a barrel 25 comprising an accommodation portion 25a in which the vented screw 24 is rotatably accommodated, and a vacuum pump 26 for creating negative pressure in the accommodation portion 25a.

The vented screw 24 is provided with a spiral flight 27 for conveying kneaded materials supplied from the second extruder 3 along the accommodation portion 25a. The flight 27 is twisted from the basal end toward the tip of the vented screw 24 in the opposite direction to the rotation direction of the vented screw 24. The vented screw 24 is coupled to a rotating device (not shown in the figures), for example, a motor. The kneaded materials supplied from the second extruder 3 are thereby continuously conveyed through the accommodation portion 25a with the rotation of the vented screw 24.

Moreover, the barrel 25 is provided with a vent-port 28 to which the vacuum pump 26 is coupled. The vent-port 28 is coupled to a communicating hole 25h which penetrates the barrel 25 and communicates with the accommodation portion 25a. Furthermore, the barrel 25 is provided with a head portion 29 which closes the accommodation portion 25a at a position facing the tip of the vented screw 24, and the head portion 29 comprises a discharge port 29a for discharging kneaded materials which are already defoamed.

According to the above-described third extruder 4, the kneaded materials supplied from the second extruder 3 receive the vacuum pressure of the vacuum pump 26 at a position facing the vent-port 28, while being conveyed toward the head portion 29 in the accommodation portion 25a by the vented screw 24. Gaseous substances, other volatile components, etc., included in the kneaded materials are thereby drawn and removed. The degassed kneaded materials are discharged from the discharge port 29a of the head portion 29, and then, processed into products suitable for purposes.

Next, the specific structure of the second extruder 3 according to the present embodiment will be described.

[Outline of the Second Extruder 3]

Figure 5:
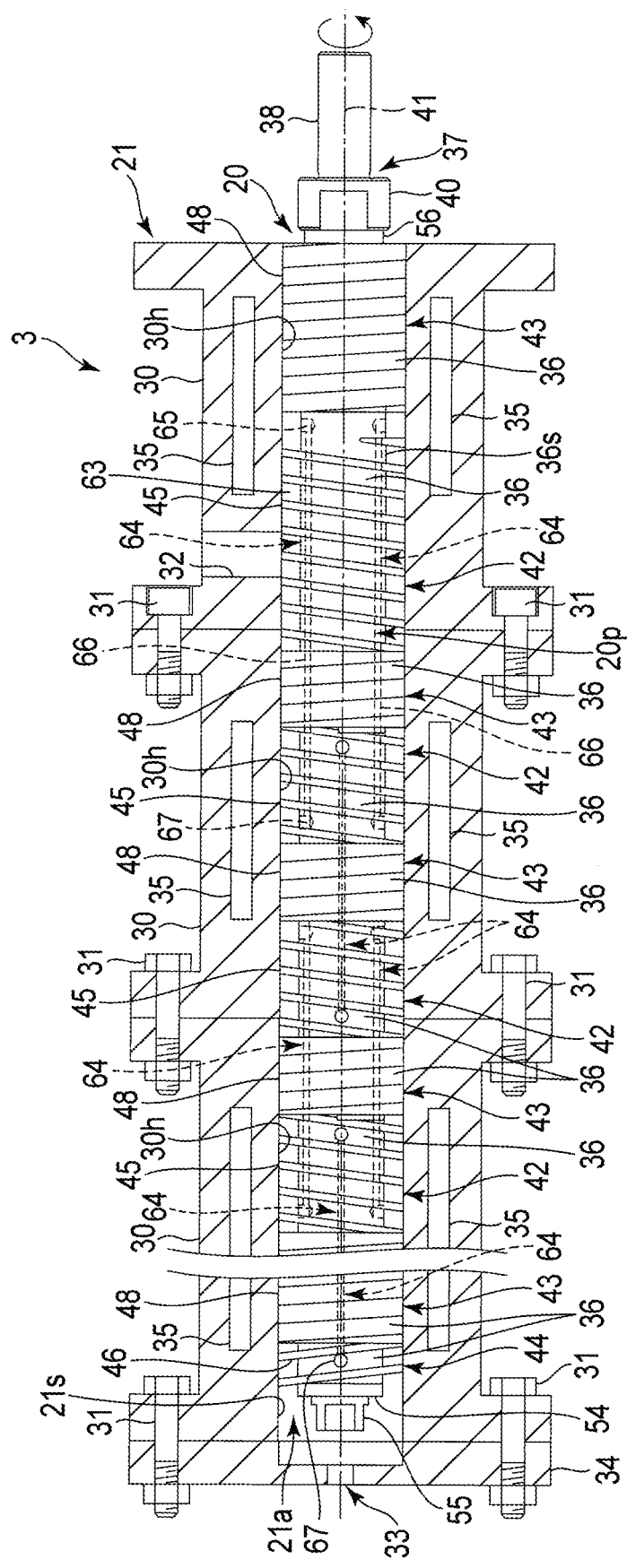
FIG. 5 is a transverse sectional view of a second extruder showing an external structure of an extruder screw.
Figure 6:
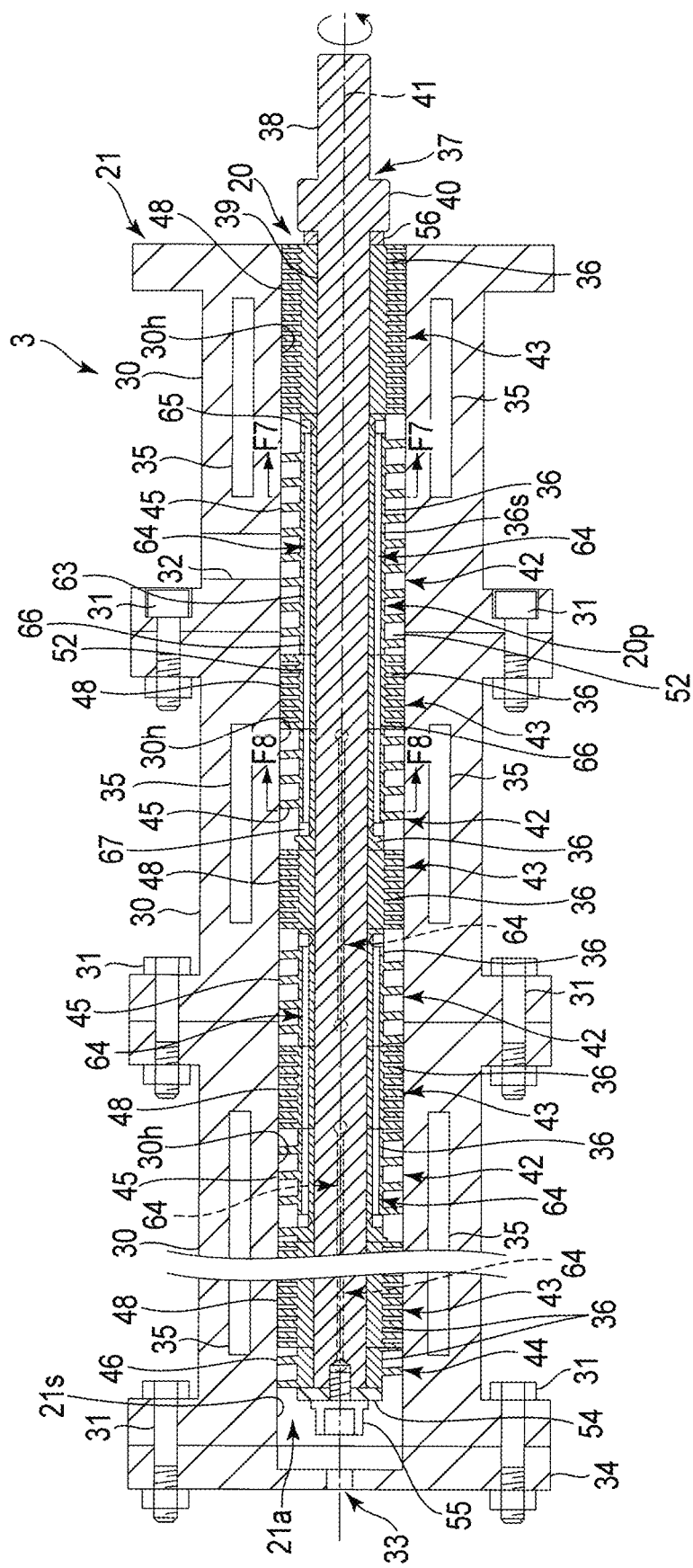
FIG. 6 is a transverse sectional view of the second extruder showing an internal structure of the extruder screw.
Figure 7:
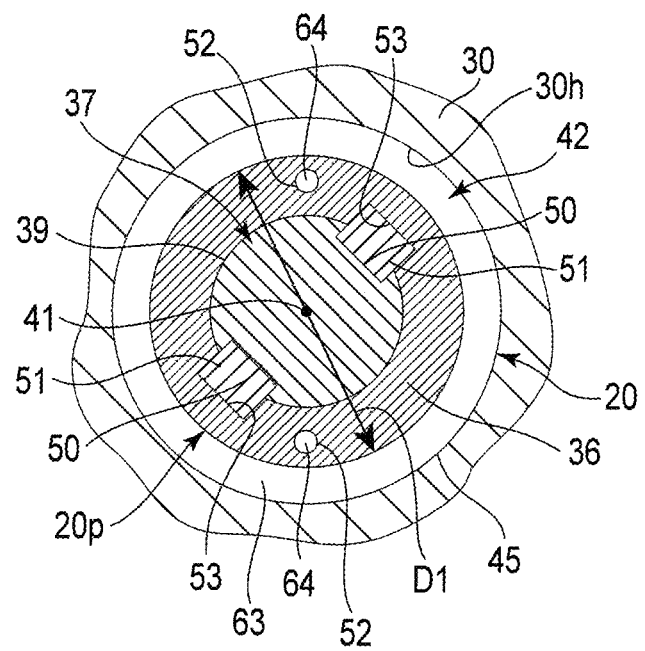
FIG. 7 is a sectional view along line F7-F7 of FIG. 6.
Figure 8:
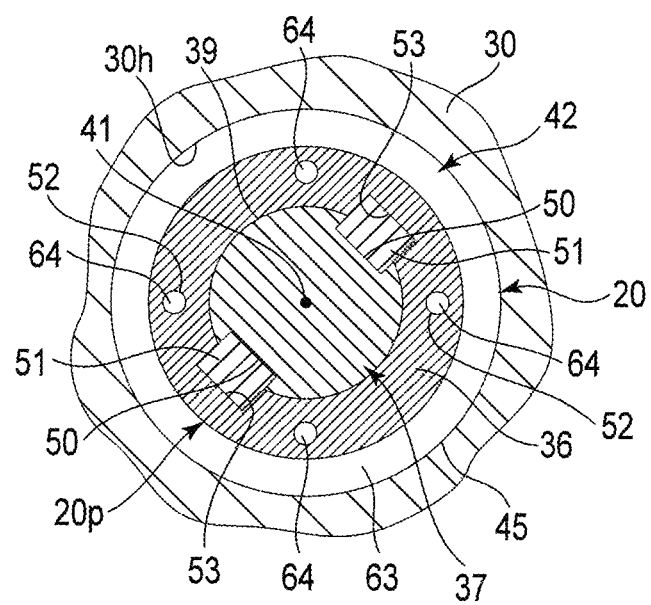
FIG. 8 is a sectional view along line F8-F8 of FIG. 6.

As shown in FIG. 5 and FIG. 6, in the second extruder 3, the barrel 21 is divided into barrel elements 30. The barrel elements 30 comprise cylindrical through-holes 30h in which the extruder screw 20 is rotatably inserted, respectively. In this case, the barrel elements 30 are integrally joined, such that the respective through-holes 30h coaxially continue, whereby the barrel 21 comprising the one continuous cylinder 21a is formed. The figures show, as an example, the barrel 21 in which the adjacent barrel elements 30 are joined to each other by bolts 31.

In a barrel element 30 located at one end of the barrel 21, a supply port 32 is provided. The supply port 32 penetrates the barrel element 30 and communicates with the cylinder 21a. Raw materials continuously supplied from the first extruder 2 through the path portion 22 are continuously supplied to the cylinder 21a through the supply port 32.

Moreover, in a barrel element 30 located at the other end of the barrel 21, a discharge port 33 is provided. The discharge port 33 is formed in a lid 34 joined to cover an opening end of the barrel element 30 at the other end. Kneaded materials kneaded in the cylinder 21a are thereby continuously extruded through the discharge port 33.

Moreover, in each of the barrel elements 30, a cooling water path 35 through which cooling water flows, a heater and a temperature sensor not shown in the figures, etc., are provided. In this case, raw materials in the cylinder 21a can be heated by turning on and off the heater to heat the barrel 21 and controlling the temperature at a temperature set in advance. At this time, if the barrel 21 exceeds the set temperature, the raw materials in the cylinder 21a can be cooled by making cooling water flow through the cooling water path 35 to cool the barrel 21 and adjusting the temperature to the temperature set in advance.

[Extruder Screw 20]

As shown in FIG. 5 to FIG. 8, the extruder screw 20 comprises a screw main body 20p. The screw main body 20p is composed of cylindrical tubes 36 and an axis of rotation 37 supporting the tubes 36. In this specification, an outer circumferential surface 36s of the screw main body 20p (the tubes 36) means an outer circumferential surface in the circumferential direction not including both end faces in the longitudinal direction of the screw main body 20p (the tubes 36).

The axis of rotation 37 extends straight from its basal end to its tip. In a state in which the extruder screw 20 is rotatably inserted in the cylinder 21a of the barrel 21, the basal end of the axis of rotation 37 is positioned on one end side of the barrel 21, on which the supply port 32 is provided, and the tip of the axis of rotation 37 is positioned on the other end side of the barrel 21, on which the discharge port 33 is provided.

From another point of view, in a state in which the extruder screw 20 is rotatably inserted in the cylinder 21a of the barrel 21, the basal end of the extruder screw 20 is positioned on the one end side of the barrel 21, on which the supply port 32 is provided, and the tip of the extruder screw 20 is positioned on the other end side of the barrel 21, on which the discharge port 33 is provided.

At the basal end of the axis of rotation 37, a coupling portion 38 and a stopper portion 40 are coaxially provided with respect to each other. The coupling portion 38 is formed, such that it can be coupled to a rotating device, for example, a motor, through a coupling not shown in the figures. The stopper portion 40 is formed to have larger contours than those of the coupling portion 38.

In an area extending from the tip of the axis of rotation 37 to an end face of the stopper portion 40, a support portion 39 (see FIG. 6) having a columnar shape is provided. The support portion 39 is formed to have smaller contours than those of the stopper portion 40. The support portion 39 coaxially extends from the end face of the stopper portion 40, and has a total length corresponding to the total length of the cylinder 21a of the barrel 21. The axis of rotation 37 rotates on a straight axial line 41 extending from its basal end to its tip, when torque from a rotating device not shown in the figures is transmitted to the coupling portion 38.

The cylindrical tubes 36 are each formed to be supported by the support portion 39 of the axis of rotation 37. As an example of this supporting structure, a pair of keys 51 is provided on the outer circumferential surface of the support portion 39. The keys 51 are fitted in a pair of groove portions 50, respectively, which is formed at positions shifted 180° in the circumferential direction along the outer circumferential surface of the support portion 39. Each of the groove portions 50 is formed by cutting out a part of the outer circumferential surface of the support portion 39 in the axial direction.

Moreover, each of the tubes 36 is formed to allow the support portion 39 to coaxially penetrate them along their inner circumferential surfaces. On the inner circumferential surfaces of the tubes 36, keyways 53 are formed at positions shifted 180° in the circumferential direction. The pair of keyways 53 is formed by cutting out a part of the inner circumferential surfaces of the tubes 36 in the axial direction.

In this case, while each of the keys 51 and a corresponding one of the keyways 53 are aligned, the support portion 39 of the axis of rotation 37 is made to penetrate along the inner circumferential surfaces of all the tubes 36. Then, a fixing screw 55 is screwed into the tip of the support portion 39 through a collar 54. At this time, all the tubes 36 are sandwiched between the tip collar 54 and a basal-end collar 56 of the stopper portion 40, and held firmly affixed to each other without any gap by the force by which they are sandwiched.

By the above-described supporting structure, all the tubes 36 are coaxially joined on the support portion 39, and thus, each of the tubes 36 and the axis of rotation 37 are integrally assembled. Because each of the tubes 36 and the axis of rotation 37 are integrally assembled, the screw main body 20p is formed as a rodlike member extending in the axial direction (longitudinal direction) from its basal end to its tip.

At this time, it becomes possible to rotate each of the tubes 36 on the axial line 41 together with the axis of rotation 37, that is, rotate the screw main body 20p on the axial line 41. Moreover, the basal end of the screw main body 20p corresponds to the basal end of the axis of rotation 37, and the tip of the screw main body 20p corresponds to the tip of the axis of rotation 37.

In such a state, each of the tubes 36 serves as a structural element that defines the outside diameter D1 (see FIG. 7) of the screw main body 20p. That is, the outside diameters D1 of the tubes 36 coaxially joined along the support portion 39 are set to be equal to each other. The outside diameter D1 of the screw main body 20p (each of the tubes 36) is defined as a diameter passing through the axial line 41, which is the center of rotation of the axis of rotation 37.

The segmental screw 20 in which the outside diameter D1 of the screw main body 20p (each of the tubes 36) is a fixed value is thereby formed. In the segmental screw 20, screw elements can be held in free order and combination along the axis of rotation 37 (that is, the support portion 39). With respect to the screw elements, for example, each of the tubes 36 on which at least parts of flights 45, 46, and 48, which will be described later, are formed can be defined as one screw element.

In this manner, by segmenting the screw 20, its convenience can be significantly improved with respect to, for example, changes and adjustments to the specifications or the upkeep and maintenance of the screw 20.

In the present embodiment, the structure in which the tubes 36 and the axis of rotation 37 are fixed and kept from rotating is not limited to the above-described combination of the keys 51 and the keyways 53. For example, a spline structure as shown in FIG. 2 may be used instead.

Moreover, the segmental screw 20 is coaxially accommodated in the cylinder 21a of the barrel 21. Specifically, the screw main body 20p with the screw elements held along the axis of rotation 37 (the support portion 39) is rotatably accommodated in the cylinder 21a. In this state, a conveyance path 63 for conveying raw materials is formed between the outer circumferential surface 36s of the screw main body 20p and an inner surface 21s of the cylinder 21a. The conveyance path 63 has an annular sectional shape in the radial direction of the cylinder 21a, and extends in the axial direction along the cylinder 21a.

In the present embodiment, the screw main body 20p is provided with conveyance portions 42 conveying raw materials and barrier portions 43 limiting the flow of raw materials. The conveyance portions 42 and the barrier portions 43 are alternately disposed in the axial direction (longitudinal direction) of the screw main body 20p.

To be specific, a barrier portion 43 is disposed at the basal end of the screw main body 20p, which corresponds to one end of the barrel 21, and the conveyance portions 42 and the barrier portions 43 are alternately disposed from the barrier portion 43 toward the tip of the screw main body 20p. In addition, a discharge conveyance portion 44 is disposed at the tip of the screw main body 20p, which corresponds to the other end of the barrel 21. The discharge conveyance portion 44 is configured to convey kneaded materials kneaded in the cylinder 21a in the opposite direction to the conveyance direction of the other conveyance portions 42.

[Structure in which Kneaded Materials are Extruded from the Basal End Toward the Tip of the Extruder Screw 20]

In the following description, the rotation direction (left-handed rotation or right-handed rotation) of the screw main body 20p is a rotation direction (left-handed rotation or right-handed rotation) from the perspective of the basal end side of the screw main body 20p. In addition, the twist direction (clockwise or anticlockwise) of the flights 45, 46, and 48 is a twist direction (clockwise or anticlockwise) of the flights 45, 46, and 48 from the perspective of the basal end side of the screw main body 20p.

Each of the conveyance portions 42 comprises the flight 45 spirally twisted. The flight 45 projects from the outer circumferential surface 36s in the circumferential direction of the tubes 36 toward the conveyance path 63. The flight 45 is twisted in the same direction as the rotation direction of the screw main body 20p. Moreover, the discharge conveyance portion 44 comprises the flight 46 spirally twisted. The flight 46 projects from the outer circumferential surface 36s in the circumferential direction of the tubes 36 toward the conveyance path 63. The flight 46 is twisted in the opposite direction to the rotation direction of the screw main body 20p.

Here, if raw materials are kneaded by rotating the screw main body 20p left-handed, the flight 45 of each of the conveyance portions 42 is twisted to convey the raw materials from the tip toward the basal end of the screw main body 20p. That is, the twist direction of the flight 45 is set to be anticlockwise as in the case of a left-handed screw.

Moreover, if raw materials are kneaded by rotating the screw main body 20p left-handed, the flight 46 of the discharge conveyance portion 44 is twisted to convey the raw materials from the basal end toward the tip of the screw main body 20p. That is, the twist direction of the flight 46 is set to be clockwise as in the case of a right-handed screw.

On the other hand, if raw materials are kneaded by rotating the screw main body 20p right-handed, the flight 45 of each of the conveyance portions 42 is twisted to convey the raw materials from the tip toward the basal end of the screw main body 20p. That is, the twist direction of the flight 45 is set to be clockwise as in the case of a right-handed screw.

Moreover, if raw materials are kneaded by rotating the screw main body 20p right-handed, the flight 46 of the discharge conveyance portion 44 is twisted to convey the raw materials from the basal end toward the tip of the screw main body 20p. That is, the twist direction of the flight 46 is set to be anticlockwise as in the case of a left-handed screw.

Each of the barrier portions 43 comprises the flight 48 spirally twisted. The flight 48 projects from the outer circumferential surface 36s in the circumferential direction of the tubes 36 toward the conveyance path 63. The flight 48 is twisted in the opposite direction to the rotation direction of the screw main body 20p.

Here, if raw materials are kneaded by rotating the screw main body 20p left-handed, the flight 48 of each of the barrier portions 43 is twisted to convey the raw materials from the basal end toward the tip of the screw main body 20p. That is, the twist direction of the flight 48 is set to be clockwise as in the case of a right-handed screw.

On the other hand, if raw materials are kneaded by rotating the screw main body 20p right-handed, the flight 48 of each of the barrier portions 43 is twisted to convey the raw materials from the basal end toward the tip of the screw main body 20p. That is, the twist direction of the flight 48 is set to be anticlockwise as in the case of a left-handed screw.

In each of the barrier portions 43, the twist pitch of the flight 48 is set to be smaller than or equal to those of the flights 45 and 46 in the conveyance portions 42 and 44 described above. Moreover, a slight clearance is secured between the apexes of the flights 45, 46, and 48 and the inner surface 21s of the cylinder 21a of the barrel 21.

In this case, a gap 47 (see FIG. 11) between an outside diameter portion 43s of each of the barrier portions 43 and the inner surface 21s of the cylinder 21a is preferably set to be within a range of 0.1 to 2 mm. More preferably, the gap 47 is set to be within a range of 0.1 to 0.7 mm. This can surely limit the conveyance of raw materials through the gap 47.

Figure 13:
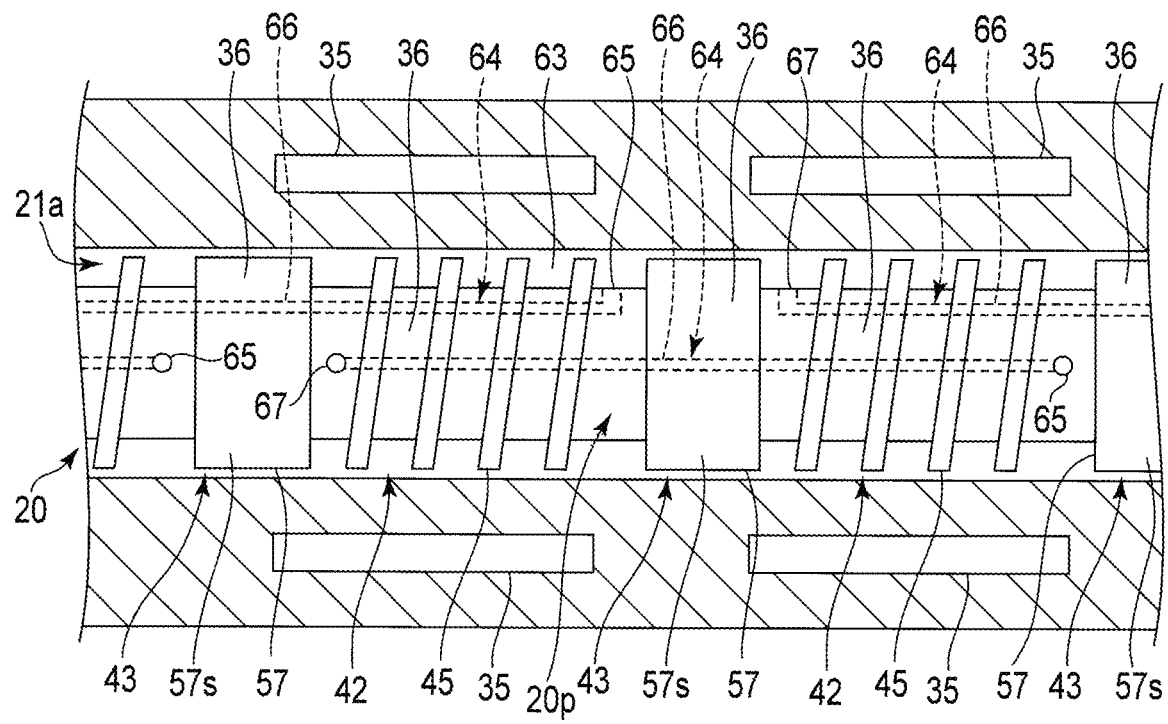
FIG. 13 is a sectional view showing the external structure of the extruder screw according to a modification of the present invention.
Figure 14:
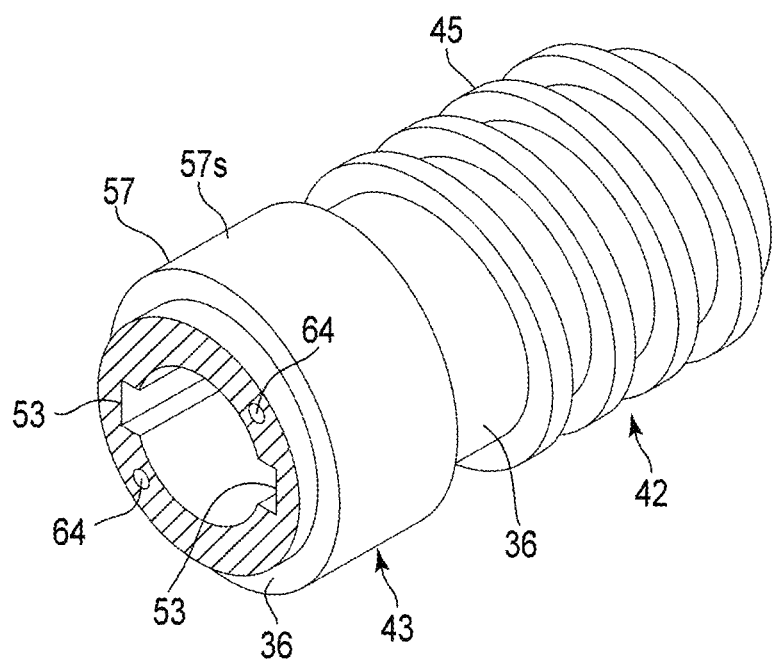
FIG. 14 is an expanded perspective view showing a part of a barrier annular body shown in FIG. 13.

In each of the barrier portions 43, a barrier annular body 57 (see FIG. 13 and FIG. 14) continuing in the circumferential direction along the outer circumferential surface 36s of the screw main body 20p may be provided instead of the flight 48. The barrier annular body 57 has a cylindrical surface 57s concentrically continuing in the circumferential direction with the axial line 41 as its center. The cylindrical surface 57s projects from the outer circumferential surface 36s in the circumferential direction of the tubes 36 toward the conveyance path 63. The space between the cylindrical surface 57s and the inner surface 21s of the cylinder 21a is set to be within the above-described range of the gap 47.

Incidentally, the lengths of the conveyance portions 42 and 44 in the axial direction of the screw main body 20p are set as appropriate in accordance with, for example, the kind of raw materials, the degree of kneading of raw materials, and the production of kneaded materials per unit time. The conveyance portions 42 and 44 are at least areas where the flights 45 and 46 are formed on the outer circumferential surface 36s of the tubes 36, but are not limited to areas between the start points and the end points of the flights 45 and 46.

That is, areas outside the flights 45 and 46 of the outer circumferential surface 36s of the tubes 36 may be regarded as the conveyance portions 42 and 44. For example, if a cylindrical spacer or a cylindrical collar is disposed at a position adjacent to the tubes 36 comprising the flights 45 and 46, the space or the collar also can be included in the conveyance portions 42 and 44.

In addition, the lengths of the barrier portions 43 in the axial direction of the screw main body 20p are set as appropriate in accordance with, for example, the kind of raw materials, the degree of kneading of raw materials, and the production of kneaded materials per unit time. The barrier portions 43 function to stop the flow of raw materials fed by the conveyance portions 42. That is, the barrier portions 43 are adjacent to the conveyance portions 42 on the downstream side in the conveyance direction of raw materials, and configured to prevent raw materials fed by the conveyance portions 42 from passing through the gap 47 between the apex of the flight 48 (the outside diameter portion 43s) and the inner surface 21s of the cylinder 21a.

In the above-described screw 20, each of the flights 45, 46, and 48 projects from the outer circumferential surface 36s of the tubes 36 having the outside diameters D1 equal to each other toward the conveyance path 63. Thus, the outer circumferential surface 36s in the circumferential direction of each of the tubes 36 defines the root diameter of the screw 20. The root diameter of the screw 20 is kept at a fixed value over the total length of the screw 20.

Moreover, as shown in FIG. 5 to FIG. 8, the screw main body 20p internally comprises paths 64 extending in the axial direction. The paths 64 are arranged in the axial direction and the circumferential direction of the screw main body 20*p*. The figures show, as an example, the structure in which two paths 64 disposed at regular intervals in the circumferential direction of the screw main body 20*p* are arranged in the axial direction of the screw main body 20*p* while they are made to differ in phase by 90°.

The paths 64 are provided at positions eccentric to the axial line 41, which is the center of rotation of the screw 20. That is, the paths 64 are shifted from the axial line 41. Thus, the paths 64 revolve around the axial line 41 with the rotation of the screw main body 20*p*.

With respect to the shapes of the paths 64, their sectional shapes can be, for example, circular, rectangular, or elliptical, as long as raw materials can flow therethrough. The figures show, as an example, the paths 64 whose sections are circular holes. In this case, the inside diameter (bore) of the holes is preferably set to be greater than or equal to 1 mm but less than 6 mm. More preferably, the inside diameter (bore) of the holes is set to be greater than or equal to 1 mm but less than 5 mm.

Inside the screw main body 20*p*, the tubes 36 of the conveyance portions 42 and the barrier portions 43 comprise tubular wall surfaces 52 defining the paths 64, which are holes. That is, the paths 64 are holes composed of hollow spaces only. The wall surfaces 52 continuously surround the hollow paths 64 in the circumferential direction. The paths 64 are thereby formed as hollow spaces which allow only the flow of raw materials. In other words, inside the paths 64, there are no other elements constituting the screw main body 20*p*. In this case, the wall surfaces 52 revolve around the axial line 41 without rotating on the axial line 41, when the screw main body 20*p* rotates.

According to the above-described paths 64, when raw materials conveyed through the conveyance path 63 by each of the conveyance portions 42 flow through the paths 64, "extension action", caused when the raw materials pass from a wide place (the conveyance path 63) to a narrow place (the paths 64), can be effectively imparted to the raw materials.

Hereinafter, a specific structure of the above-described paths 64 will be described.

Figure 9:
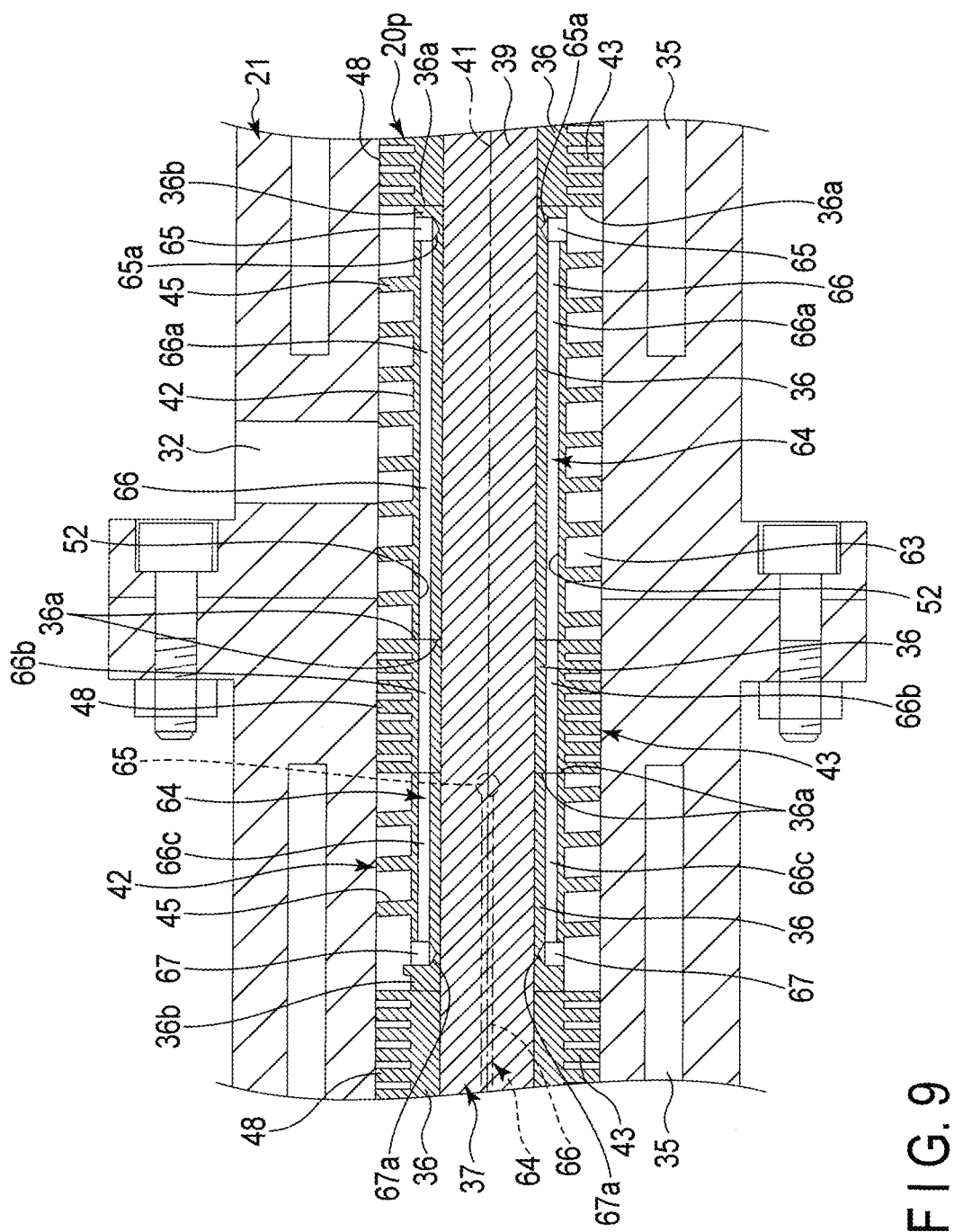
FIG. 9 is an expanded sectional view showing a part of a structure of a path formed entirely through three tubes.

As shown in FIG. 6 and FIG. 9, in the extruder screw 20 according to the present embodiment, the paths 64 are provided with a space therebetween in the axial direction (longitudinal direction) inside the screw main body 20*p* in which the conveyance portions 42 and the barrier portions 43 are alternately arranged in the axial direction (longitudinal direction). By this screw structure, the screw 20 comprising the screw main body 20*p* having the function of continuously imparting shearing action and extension action to raw materials can be achieved.

Here, if we focus on one barrier portion 43 and two conveyance portions 42 adjacent to both sides of the barrier portion 43 in the above-described screw structure, one path 64 is provided entirely through a tube 36 of the barrier portion 43 and entirely through tubes 36 of the two conveyance portions 42. This structure can be regarded as one structurally united unit.

The screw main body 20*p* according to the present embodiment is formed by arranging units identical to the unit in the axial direction (longitudinal direction). The unidirectional screw structure in which raw materials never pass through places where they have once passed can be thereby achieved.

In other words, the above-described one unit can be regarded as one functionally united module. As the functions of one module, for example, the function of imparting shearing action to raw materials, the function of imparting extension action to raw materials, the function of stopping the conveyance of raw materials with the barrier portions 43, the function of guiding raw materials, the pressure on which has been increased by the barrier portions 43, to the paths 64, and the function of forming a raw-material receiver R in which the filling rate of raw materials is 100% just before the barrier portions 43 are assumed.

Moreover, in the above-described screw structure, the paths 64 each comprise an entrance 65, an exit 67, and a path main body 66 connecting the entrance 65 and the exit 67. The entrance 65 and the exit 67 are provided to be remote from both sides of the one barrier portion 43 in the above-described one unit. That is, the entrance 65 is provided on one side of the path main body 66 (portion closer to the basal end of the screw main body 20*p*). The exit 67 is provided on the other side of the path main body 66 (portion closer to the tip of the screw main body 20*p*).

Specifically, in the conveyance portion 42 adjacent to the barrier portion 43 from the basal end side of the screw main body 20*p*, the entrance 65 is opened in the outer circumferential surface 36*s* near the downstream end of the conveyance portion 42. On the other hand, in the conveyance portion 42 adjacent to the barrier portion 43 from the tip side of the screw main body 20*p*, the exit 67 is opened in the outer circumferential surface 36*s* near the upstream end of the conveyance portion 42.

The positions where the entrance 65 and the exit 67 are formed can be freely set within the conveyance portions 42. The figures show, as an example, the structure in which the entrance 65 and the exit 67 are formed at the furthest ends from both sides of the one barrier portion 43.

The entrance 65 is a hole bored in the radial direction in the outer circumferential surface 36*s* of the tubes 36 (the screw main body 20*p*). The entrance 65 can be formed by, for example, machining with a drill. As a result, a bottom portion 65*a* of the entrance 65 is formed as an inclined surface shaved off into the shape of a cone by the tip of the drill. In other words, the bottom portion 65*a* in the shape of a cone is an inclined surface widening toward the outer circumferential surface 36*s* of the screw main body 20*p*.

The exit 67 is a hole bored in the radial direction in the outer circumferential surface 36*s* of the tubes 36 (the screw main body 20*p*). The exit 67 can be formed by, for example, machining with a drill. As a result, a bottom portion 67*a* of the exit 67 is formed as an inclined surface shaved off into the shape of a cone by the tip of the drill. In other words, the bottom portion 67*a* in the shape of a cone is an inclined surface widening toward the outer circumferential surface 36*s* of the screw main body 20*p*.

The path main body 66 is formed entirely through a tube 36 of one barrier portion 43 and entirely through tubes 36 of two conveyance portions 42 adjacent to both sides of the barrier portion 43. The path main body 66 is composed of first to third portions 66*a*, 66*b*, and 66*c*.

The first portion 66*a* is formed in the tube 36 of the conveyance portion 42 adjacent to the barrier portion 43 from the basal end side of the screw main body 20*p*. The first portion 66*a* extends parallel to the axial line 41. One end (the barrier portion 43 side) of the first portion 66*a* is opened in an end face 36*a* of the tube 36. The other end (the opposite side to the barrier portion 43) of the first portion 66*a* is closed by an end wall 36*b* of the tube 36. Moreover, the other end of the first portion 66*a* communicates with and is connected to the above-described entrance 65.

The second portion 66*b* is formed in the tube 36 of the barrier portion 43. The second portion 66*b* extends parallel to the axial line 41. Both ends of the second portions 66b are opened in end faces 36a on both sides of the tube 36.

The third portion 66c is formed in the tube 36 of the conveyance portion 42 adjacent to the barrier portion 43 from the tip side of the screw main body 20p. The third portion 66c extends parallel to the axial line 41. One end (the barrier portion 43 side) of the third portion 66c is opened in an end face 36a of the tube 36. The other end (the opposite side to the barrier portion 43) of the third portion 66c is closed by an end wall 36b of the tube 36. Moreover, the other end of the third portion 66c communicates with and is connected to the above-described exit 67.

The path main body 66 can be formed by constricting the three tubes 36 in which the first to third portions 66a, 66b, and 66c are formed in the axial direction, and firmly affixing the end faces 36a thereof to each other. In this state, the path main body 66 extends straight and continuously without branching on the way in the axial direction of the screw main body 20p. In addition, both sides of the path main body 66 communicate with and are connected to the entrance 65 and the exit 67 described above.

In this case, the bore of the path main body 66 may be set to be smaller than those of the entrance 65 and the exit 67, or may be set to be equal to them. In either case, the path sectional area defined by the bore of the path main body 66 is set to be much smaller than the annular sectional area in the radial direction of the above-described annular conveyance path 63.

In the present embodiment, each of the tubes 36 on which at least parts of the flights 45, 46, and 48 are formed can be regarded as a screw element corresponding to one of the conveyance portions 42 and 44 and the barrier portions 43.

Thus, the screw main body 20p of the screw 20 can be formed by sequentially disposing the tubes 36 as screw elements on the outer circumference of the axis of rotation 37 (the support portion 39). Therefore, the conveyance portions 42 and 44 and the barrier portions 43 can be exchanged and rearranged in accordance with, for example, the degree of kneading of raw materials, and the exchange and the rearrangement can be easily performed.

Moreover, by constricting the tubes 36 as screw elements in the axial direction and firmly affixing them to each other, the path main body 66 of each of the paths 64 is formed, and the entrance 65 and the exit 67 of each of the paths 64 are integrally connected through the path main body 66. Thus, in order to form the paths 64 in the screw main body 20p, it suffices that a process for providing the paths 64 is performed for each of the tubes 36 having a length sufficiently shorter than the total length of the screw main body 20p. Thus, the paths 64 can be easily processed and handled when being formed.

Next, the operation of kneading raw materials with the extruder screw 20 having the above-described structure will be described. In this description of the operation, it is assumed that kneaded materials are extruded from the basal end toward the tip of the screw main body 20p while the extruder screw 20 is rotated left-handed in an anticlockwise direction. In this case, raw materials are continuously supplied to the second extruder 3 comprising the extruder screw 20 from the first extruder 2. The raw materials are raw materials in a melted state produced by preliminarily kneading materials in the first extruder 2.

As shown in FIG. 10 and FIG. 11, the raw materials supplied to the second extruder 3 are continuously supplied from the supply port 32 (see FIG. 5 and FIG. 6) of the barrel 21 toward the outer circumferential surface 36s of the screw main body 20p. The supplied raw materials are conveyed in an S1-direction from the tip toward the basal end of the screw main body 20p by the flights 45 of the conveyance portions 42.

During the conveyance in the S1-direction, "shearing action", caused by a difference in speed between the flights 45 of the conveyance portions 42 rotating along the conveyance path 63 and the inner surface 21s of the cylinder 21a, is imparted to the raw materials, and stirring action, caused by the rotation of the spiral flights 45, is imparted to them. The nanodispersion of the raw materials is thereby promoted.

The conveyance of the raw materials conveyed in the S1-direction is limited by the barrier portions 43. That is, the flights 48 of the barrier portions 43 act to convey the raw materials from the basal end toward the tip of the screw main body 20p in the opposite direction to the S1-direction. As a result, the flow of raw materials is stopped by the barrier portions 43.

At this time, the pressure on the raw materials is increased at boundaries between the conveyance portions 42 and the barrier portions 43. Specifically, FIG. 11 shows the filling rate of raw materials at the places in the conveyance path 63, which correspond to the conveyance portions 42 of the screw main body 20p, with gradations. That is, in the conveyance path 63, the filling rate of raw materials becomes greater as the tone becomes darker. As is clear from FIG. 11, the filling rate of raw materials becomes greater as they approach the barrier portions 43 in the conveyance path 63 corresponding to the conveyance portions 42. Just before the barrier portions 43, the filling rate of raw materials is 100%.

Thus, just before the barrier portions 43, the "raw-material receiver R" in which the filling rate of raw materials is 100% is formed. In the raw-material receiver R, the flow of raw materials is stopped, and thus, the pressure on the raw materials is increased. The raw materials, the pressure on which has been increased, continuously flow into the path main body 66 from the entrance 65 opening in the outer circumferential surface 36s of the conveyance portions 42 (the tubes 36), and flow back through the path main body 66 in an S2-direction from the basal end toward the tip of the screw main body 20p in the opposite direction to the S1-direction.

As described above, the path sectional area defined by the bore of the path main body 66 is much smaller than the annular sectional area of the conveyance path 63 in the radial direction of the cylinder 21a. From another point of view, a widening area based on the bore of the path main body 66 is much smaller than that of the annular conveyance path 63. Therefore, the raw materials are rapidly squeezed when flowing from the entrance 65 into the path main body 66, and thus, "extension action" is imparted to the raw materials.

Moreover, since the path sectional area is sufficiently smaller than the annular sectional area, raw materials collecting in the raw-material receiver R do not disappear. That is, some of the raw materials collecting in the raw-material receiver R continuously flow into the entrance 65. In the meantime, new raw materials are fed toward the barrier portions 43 by the flights 45 of the conveyance portions 42. As a result, the filling rate just before the barrier portions 43 in the raw-material receiver R is thereby kept at 100% all the time. At this time, even if the amount of raw materials conveyed by the flights 45 somewhat changes, the change is absorbed by raw materials remaining in the raw-material receiver R. Raw materials can be thereby continuously and stably supplied to the path main body 66. Thus, in the path main body 66, extension action can be uninterruptedly and continuously imparted to the raw materials.

The raw materials which have passed through the path main body 66 flow out of the exit 67 toward the outer circumferential surface 36s of the screw main body 20p. On the screw main body 20p, the conveyance portions 42 and the barrier portions 43 described above are alternately arranged in the axial direction. Thus, when the above-described series of shearing and extension operations is repeated, raw materials in the cylinder 21a are continuously conveyed from the basal end toward the tip of the screw main body 20p in a state in which a shearing flow and an extension flow are repeated. The degree of kneading of raw materials is thereby increased.

Then, kneaded materials kneaded at a nanolevel flow out of the exit 67 formed in the discharge conveyance portion 44. The kneaded materials which have flowed out are conveyed in an S3-direction by the flight 46 of the discharge conveyance portion 44, and then, continuously extruded from the discharge port 33 (see FIG. 5 and FIG. 6).

Gaseous components included in the kneaded materials which have been extruded from the discharge port 33 of the second extruder 3 are drawn and removed by the third extruder 4, and then, the kneaded materials are discharged to the outside. The discharged kneaded materials are, for example, soaked in cooling water stored in a water tank, and forcibly cooled. In this manner, a desired resin molding is obtained.

Here, results of a high dispersion verification test performed on kneaded materials in the case where raw materials are kneaded by the above-described shearing and extension operation will be described.

In the test, the two kinds of materials 5, a polycarbonate (PC) resin and a polymethyl methacrylate (PMMA) resin, are supplied to the first extruder 2, and the materials 5 in a melted state are produced by preliminarily kneading them. In addition, the materials 5 in a melted state are continuously supplied from the first extruder 2 to the second extruder 3 as raw materials of the second extruder 3.

In the test, the extruder screw 20 is configured to repeat the above-described shearing and extension operation ten times. Further, the specifications of the extruder screw 20 are set as follows: the screw diameter is set at 36 mm, the screw effective length (L/D) is set at 25, the screw rotational rate is set at 1,400 rpm, the supply of raw materials is set at 1.4 kg/h, and the barrel set temperature is set at 260° C.

Through the above-described test, intended transparent kneaded materials were continuously obtained.

As described above, according to the screw 20 of the present embodiment, shearing action regions and extension action regions alternately continue in the axial direction, and thus, kneaded materials can be continuously produced while shearing action and extension action are imparted to raw materials. In this case, raw materials can be continuously supplied from the first extruder 2 to the second extruder 3 without making them remaining. The completely continuous production, not apparently continuous production, of kneaded materials can be thereby enabled.

As a result, the optimum operating conditions can be set for the first extruder 2 and the second extruder 3, while their operating conditions are associated with each other. For example, if resin is preliminarily kneaded with the first extruder 2, the screw rotational rate can be set at 100 to 300 rpm as it has been conventionally set. Thus, the resin can be sufficiently heated and melted, and preliminarily kneaded. At this time, in the second extruder 3, the screw 20 can be rotated at a high rate of 600 to 3,000 rpm. Thus, shearing action and extension action can be alternately and effectively imparted to the resin.

Moreover, the screw 20 of the present embodiment has the unidirectional screw structure in which raw materials never pass through places where they have once passed. Thus, the number of times shearing action and extension action are imparted to raw materials can be set in advance at the stage at which the structure of the screw 20 is determined. Accordingly, the number of times shearing action and extension action are imparted to raw materials and the time for which shearing action and extension action are imparted to raw materials can be increased without elongating the screw 20. As a result, raw materials can be kneaded to an intended degree of kneading.

Moreover, according to the present embodiment, a flow of raw materials in a different kneaded state located ahead of or behind a particular flow of raw materials is not mixed into the particular flow of raw materials because of the unidirectional screw structure in which raw materials never pass through places where they have once passed. Thus, raw materials can be uniformly kneaded.

Furthermore, according to the present embodiment, the outside diameter D1 of the screw main body 20p (each of the tubes 36) is set at a fixed value, in other words, the root diameter of the screw 20 is set at a fixed value over the total length of the screw 20. Thus, the segmental screw 20 in which screw elements can be held in free order and combination can be achieved. By segmenting the screw 20, its convenience can be significantly improved with respect to, for example, changes and adjustments to the specifications or the upkeep and maintenance of the screw 20.

In addition, the root diameter of the screw 20 is set at a fixed value over the total length of the screw 20. Thus, the conveyance path 63 for conveying raw materials has uniform annular sectional shapes over the total length of the screw 20. When shearing action and extension action are alternately imparted to raw materials, they can be sequentially and smoothly imparted, and uniform kneading can be performed.

Moreover, according to the present embodiment, the sectional area of the paths 64 (the path main bodies 66) is set to be much smaller than that of the conveyance path 63 for conveying raw materials. Thus, extension action can be uniformly, stably and efficiently imparted to raw materials passing through the paths 64 (the path main bodies 66).

Furthermore, in the screw 20, the conveyance portions 42, the barrier portions 43, and the paths 64 are disposed in combination without a plasticization zone provided in a screw of a conventional single screw extruder. Thus, the second extruder 3 can be easily operated.

While one of the embodiments of the present invention has been hereinabove described, the present invention is not limited to the one embodiment. The following modifications are also included in the technical scope of the present invention.

[Structure in which Kneaded Materials are Extruded from the Tip Toward the Basal End of the Extruder Screw 20]

In the following description, the rotation direction (left-handed rotation or right-handed rotation) of the screw main body 20p is a rotation direction (left-handed rotation or right-handed rotation) from the perspective of the basal end side of the screw main body 20p. In addition, the twist direction (clockwise or anticlockwise) of flights 60, 61, 62a, and 62b is a twist direction (clockwise or anticlockwise) of the flights 60, 61, 62a, and 62b from the perspective of the basal end side of the screw main body 20p.

Figure 12:
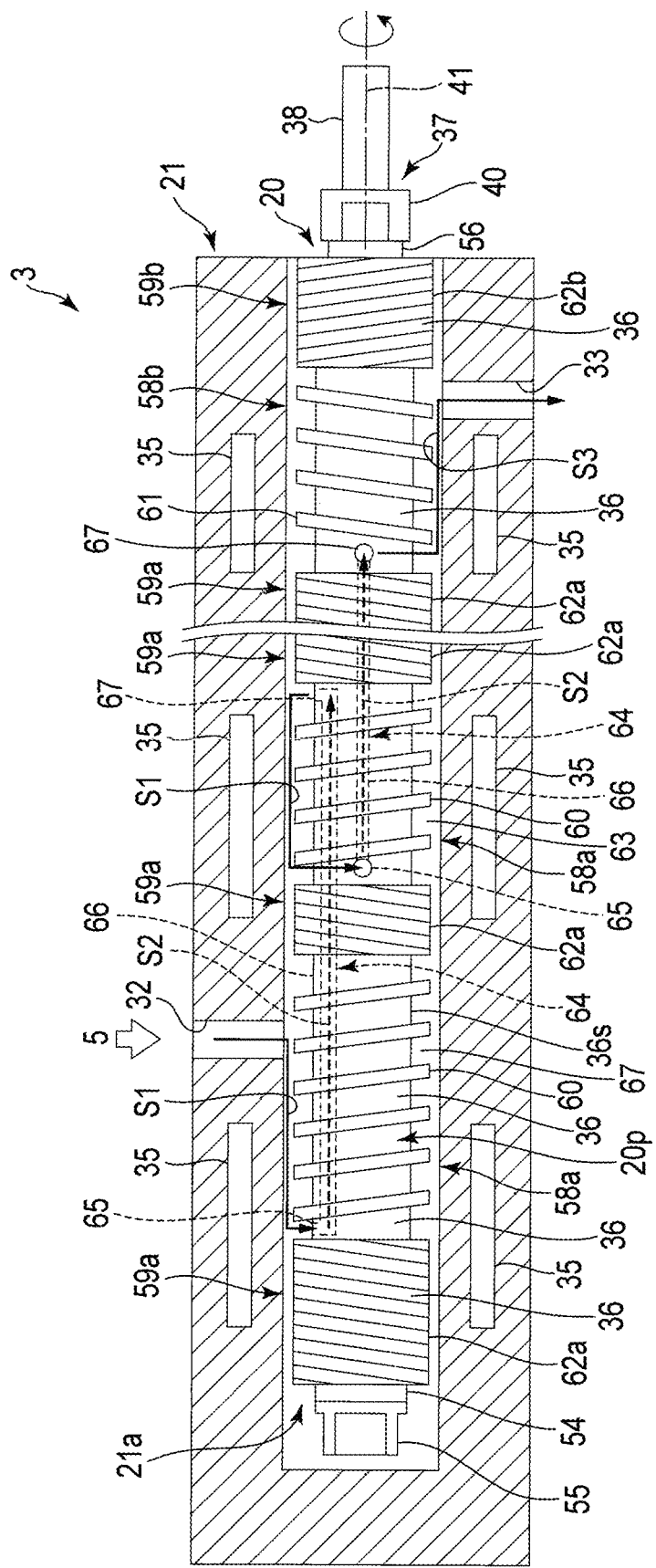
FIG. 12 is a sectional view schematically showing a structure of the second extruder according to a modification of the present invention.

FIG. 12 shows the structures of the second extruder 3 according to a modification of the present invention and the extruder screw 20 according to the modification of the present invention applied to the second extruder 3.

In the second extruder 3 according to the present modification, the supply port 32 is provided on the other end side of the barrel 21, and the discharge port 33 is provided on the one end side of the barrel 21. In addition, in the extruder screw 20, conveyance portions 58a and 58b and barrier portions 59a and 59b are alternately arranged from the tip toward the basal end of the screw main body 20p.

In a state in which the extruder screw 20 according to the present modification is rotatably inserted in the cylinder 21a, the basal ends of the extruder screw 20 and the screw main body 20p are positioned on the one end side of the barrel 21, on which the discharge port 33 is provided, and the tips of the extruder screw 20 and the screw main body 20p are positioned on the other end side of the barrel 21, on which the supply port 32 is provided.

In this case, the discharge conveyance portion 58b facing the discharge port 33 is configured to convey kneaded materials kneaded in the cylinder 21a in the opposite direction S3 to the conveyance direction S1 of the other conveyance portions 58a. Moreover, the basal-end barrier portion 59b disposed at the basal end of the screw main body 20p is configured to limit the conveyance of kneaded materials by the discharge conveyance portion 58b.

In the conveyance portions 58a other than the discharge conveyance portion 58b, the flights 60 spirally twisted along the outer circumferential surface 36s of the screw main body 20p are provided. The flights 60 are twisted from the basal end toward the tip of the screw main body 20p in the opposite direction to the rotation direction of the screw main body 20p. On the other hand, the spiral discharge flight 61 provided in the discharge conveyance portion 58b is twisted in the same direction as the rotation direction of the screw main body 20p from the basal end toward the tip of the screw main body 20p.

FIG. 12 shows the structure in the case where raw materials are kneaded by rotating the screw main body 20p left-handed. In this case, the twist direction of the flights 60 is set to be clockwise as in the case of a right-handed screw to convey raw materials from the basal end toward the tip of the screw main body 20p.

On the other hand, the twist direction of the discharge flight 61 is set to be anticlockwise as in the case of a left-handed screw to convey raw materials from the tip toward the basal end of the screw main body 20p. If raw materials are kneaded by rotating the screw main body 20p right-handed, it suffices that the twist direction of each of the flights 60 and 61 is set to be opposite to that in the above-described case of left-handed rotation.

Moreover, in each of the barrier portions 59a and 59b, the barrier annular body 57 (see FIG. 13 and FIG. 14) continuing in the circumferential direction along the outer circumferential surface 36s of the screw main body 20p may be provided, or the barrier flights 62a and 62b (see FIG. 12) spirally twisted along the outer circumferential surface 36s of the screw main body 20p may be provided.

If the barrier flights 62a and 62b are provided, the barrier flight 62b twisted from the basal end toward the tip of the screw main body 20p in the opposite direction to the rotation direction of the screw main body 20p is provided in the basal-end barrier portion 59b disposed at the basal end of the screw main body 20p. Moreover, the barrier flight 62a twisted from the basal end toward the tip of the screw main body 20p in the same direction as the rotation direction of the screw main body 20p is provided in each of the other barrier portions 59a.

Here, if raw materials are kneaded by rotating the screw main body 20p left-handed, the twist direction of the barrier flight 62b in the basal-end barrier portion 59b is set to be clockwise as in the case of a right-handed screw from the basal end toward the tip of the screw main body 20p. On the other hand, the twist direction of the other barrier flights 62a is set to be anticlockwise as in the case of a left-handed screw from the basal end toward the tip of the screw main body 20p. If raw materials are kneaded by rotating the screw main body 20p right-handed, it suffices that the twist direction of each of the barrier flights 62a and 62b is set to be opposite to that in the above-described case of left-handed rotation.

Moreover, the other structures (for example, the structure of the paths 64) can be set based on the above described "structure in which kneaded materials are extruded from the basal end toward the tip of the extruder screw 20", and thus, description thereof is omitted.

Next, the operation of kneading raw materials with the extruder screw 20 having the above-described structure will be described. In the description of the operation, it is assumed that kneaded materials are extruded from the tip toward the basal end of the screw main body 20p while the extruder screw 20 is rotated left-handed in an anticlockwise direction.

As shown in FIG. 12, raw materials continuously supplied from the supply port 32 of the barrel 21 toward the outer circumferential surface 36s of the screw main body 20p are conveyed in the S1-direction from the basal end toward the tip of the screw main body 20p by the flights 60 of the conveyance portions 58a.

During the conveyance in the S1-direction, "shearing action", caused by a difference in speed between the flights 60 of the conveyance portions 58a rotating along the conveyance path 63 and the inner surface 21s of the cylinder 21a, is imparted to the raw materials, and stirring action, caused by the rotation of the spiral flights 60, is imparted to them. The nanodispersion of the raw materials is thereby promoted.

The conveyance of the raw materials conveyed in the S1-direction along the conveyance path 63 is limited by the barrier portions 59a. That is, the flights 62a of the barrier portions 59a are twisted to convey the raw materials from the tip toward the basal end of the screw main body 20p in the opposite direction to the S1-direction. As a result, the flow of raw materials is stopped by the barrier portions 59a.

Because the flow of raw materials is stopped, the pressure on the raw materials is increased. Although not particularly shown in the figures, also in the present modification, just before the barrier portions 59a, the filling rate of raw materials is 100% and the pressure on the raw materials is increased as in the above-described embodiment. The raw materials, the pressure on which has been increased, continuously flow into the path main body 66 from the entrance 65, and flow back through the path main body 66 in the S2-direction from the tip toward the basal end of the screw main body 20p in the opposite direction to the S1-direction. The above-described "extension action" is imparted to the raw materials while they are flowing back in the S2-direction.

The raw materials which have passed through the path main body 66 flow out of the exit 67 toward the outer circumferential surface 36s of the screw main body 20p. On the screw main body 20p, the conveyance portions 58a and the barrier portions 59a described above are alternately arranged in the axial direction. Thus, when the above-described series of shearing and extension operations is repeated, raw materials in the cylinder 21a are continuously conveyed from the tip toward the basal end of the screw main body 20p in a state in which a shearing flow and an extension flow are repeated. The degree of kneading of raw materials is thereby increased.

Then, kneaded materials kneaded at a nanolevel flow out of the exit 67 formed in the discharge conveyance portion 58b. The kneaded materials which have flowed out are conveyed in the S3-direction by the flight 61 of the discharge conveyance portion 58b, and then continuously extruded from the discharge port 33 while the conveyance of the kneaded materials is limited by the basal-end barrier portion 59b.

The advantages of the second extruder 3 and the extruder screw 20 according to the present modification are the same as those of the above-described one embodiment, and thus, description thereof is omitted.

Other Modifications

In the above-described one embodiment, it has been assumed that the paths 64 (specifically, the path main bodies 66) are formed inside the screw main body 20p (the tubes 36). However, instead, the paths 64 (the path main bodies 66) may be formed at boundaries between each of the tubes 36 and the axis of rotation 37 when the support portion 39 of the axis of rotation 37 is made to penetrate along the inner circumferential surface of each of the tubes 36 constituting the screw main body 20p. FIG. 15 to FIG. 18 show the structure of a portion corresponding to FIG. 7 as the structure of the present modification.

Figure 15:
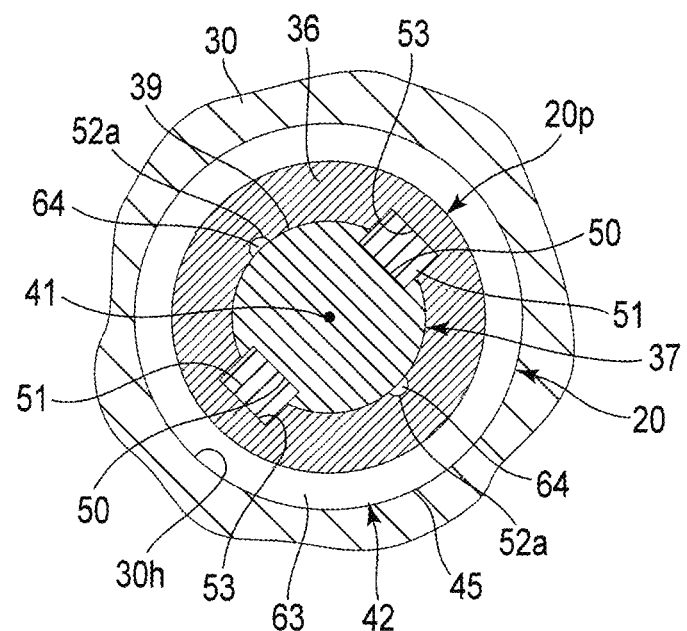
FIG. 15 is a longitudinal sectional view schematically showing the structure of the extruder screw in which paths are provided along an inner circumferential surface of a tube in a modification of the present invention.

The paths 64 shown in FIG. 15 are composed of wall surfaces 52a formed by recessing parts of the inner circumferential surfaces of the tubes 36 into the shape of depressions in the axial direction. In this case, the paths 64 surrounded by the wall surfaces 52a and the outer circumferential surface of the support portion 39 can be defined by making the axis of rotation 37 (the support portion 39) penetrate along the inner circumferential surfaces of the tubes 36.

Figure 16:
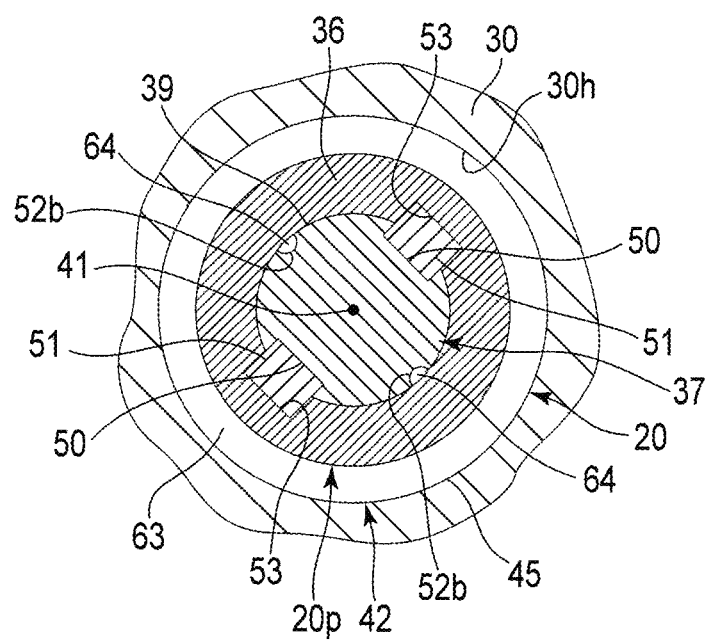
FIG. 16 is a longitudinal sectional view schematically showing the structure of the extruder screw in which the paths are provided along an outer circumferential surface of an axis of rotation in a modification of the present invention.

The paths 64 shown in FIG. 16 are composed of wall surfaces 52b formed by recessing parts of the outer circumferential surface of the axis of rotation 37 (the support portion 39) into the shape of depressions in the axial direction. In this case, the paths 64 surrounded by the wall surfaces 52b and the inner circumferential surfaces of the tubes 36 can be defined by making the axis of rotation 37 (the support portion 39) penetrate along the inner circumferential surfaces of the tubes 36.

Figure 17:
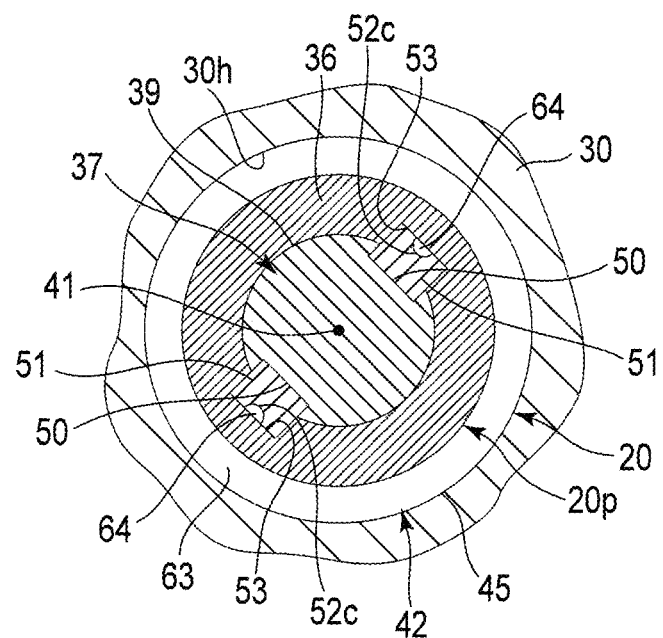
FIG. 17 is a longitudinal sectional view schematically showing the structure of the extruder screw in which the paths are provided along surfaces of keys in a modification of the present invention.

The paths 64 shown in FIG. 17 are composed of wall surfaces 52c formed by recessing parts of the outer peripheral surfaces of the keys 51 into the shape of depressions in the axial direction. In this case, the paths 64 surrounded by the wall surfaces 52c and groove bottom surfaces of the keyways 53 can be defined by making the axis of rotation 37 (the support portion 39) penetrate along the inner circumferential surfaces of the tubes 36.

In any of the paths 64, the wall surfaces 52a, 52b, and 52c can be formed simply by processing portions exposed to the outside into the shape of depressions, and thus, the formation can be easily performed. In this case, various shapes, for example, semicircular, triangular, elliptical, and rectangular, can be applied as the shapes of the wall surfaces 52a, 52b, and 52c in the shape of depressions.

Figure 18:
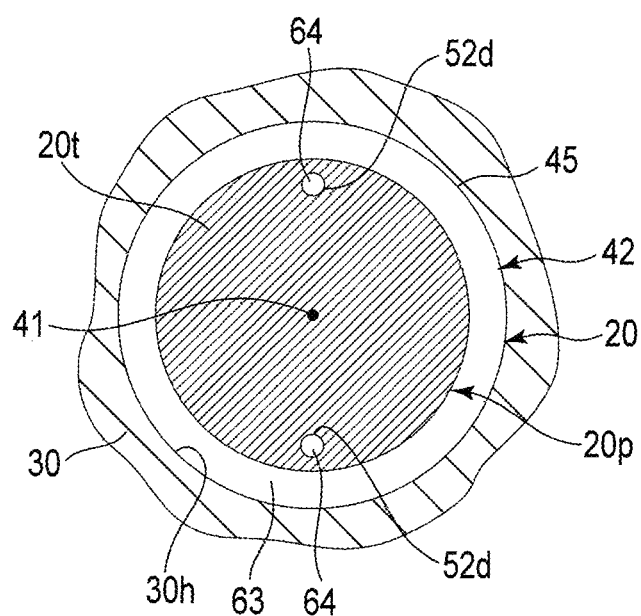
FIG. 18 is a longitudinal sectional view schematically showing the structure of the extruder screw in which a screw main body is formed of one axial member in a modification of the present invention.

In addition, in the above-described one embodiment, the screw main body 20p is composed of the tubes 36 and the axis of rotation 37. However, the screw main body 20p may be composed of one straight axial member 20t as shown in FIG. 18 instead. In this case, the above-described conveyance portions and barrier portions are provided on the outer circumferential surface of the solid screw main body 20p, and the above-described paths 64 are provided inside the screw main body 20p. The figure shows, as an example, the pair of paths 64 provided at positions eccentric to the axial line 41 and defined by tubular wall surfaces 52d, but do not limit the disposition of each of the paths 64.

Moreover, in the above-described one embodiment, the paths 64, both ends of which are completely closed, have been assumed. However, the paths 64, both ends of which are openable, may be applied instead. To the paths 64, the following formation method can be applied. That is, a path constituent portion which penetrates the screw main body 20p in the axial direction is formed in advance. Next, along the one continuous path constituent portion, blockages are inserted with a space therebetween to be extractable. The path constituent portion, both ends of which are openable by the adjacent blockages, is thereby formed. Then, the paths 64 according to the present modification can be formed by opening both sides of the path constituent portion in the outer circumferential surface 36s of the screw main body 20p.

In the above-described one embodiment, as the second extruder 3, a single screw extruder equipped with one extruder screw 20 has been assumed. However, the second extruder 3 may be a twin screw extruder equipped with two extruder screws 20 instead.

Incidentally, in the above-described one embodiment, FIG. 5, FIG. 6, and FIG. 9 show the paths 64 in which both sides of the path main body 66 are connected to the entrance 65 and the exit 67 at positions shifted from the bottom portions 65a and 67a of the entrance 65 and the exit 67. However, the connection relationship between the path main body 66 and the entrance 65 and the exit 67 is not limited to that of the above-described one embodiment, and the following connection relationship is also included in the technical scope of the present invention.

FIG. 19 to FIG. 24 show, as examples, the path 64 in which both ends of the path main body 66 are connected to the bottom portions 65a and 67a of the entrance 65 and the exit 67. Specifically, one side of the path main body 66, that is, the above-described other end of the first portion 66a, is connected to the bottom portion 65a of the entrance 65. Moreover, the other side of the path main body 66, that is, the above-described other end of the third portion 66c, is connected to the bottom portion 67a of the exit 67.

FIGS. 19 (A) and (B) and FIGS. 20 (A) and (B) show the path 64 according to a first modification. In the path 64, an end face on one side of the path main body 66 (the other end of the first portion 66a) is connected to the bottom portion 65a of the entrance 65. In the bottom portion 65a, one opening 65b communicating with the path main body 66 (the first portion 66a) is formed. On the other hand, an end face on the other side of the path main body 66 (the other end of the third portion 66c) is connected to the bottom portion 67a of the exit 67. In the bottom portion 67a, one opening 67b communicating with the path main body 66 (the third portion 66c) is formed.

The one opening 65b of the entrance 65 is formed in a region facing the bottom portion 65a having a shape widening toward the outer circumferential surface 36s of the screw main body 20p. On the other hand, the one opening 67b of the exit 67 is formed in a region facing the bottom portion 67a having a shape widening toward the outer circumferential surface 36s of the screw main body 20p.

In this case, raw materials which have flowed into the entrance 65 are guided toward the opening 65b along the inclination of the bottom portion 65a. As a result, the raw materials do not remain in the entrance 65, and all of them continuously and smoothly flows into the path main body 66. The raw materials which have passed through the path main body 66 then flow into the exit 67. The raw materials which have flowed into the exit 67 are guided toward the outer circumferential surface 36a of the screw main body 20p along the inclination of the bottom portion 67a. As a result, the raw materials do not remain in the exit 67, and all of them continuously and smoothly flows out toward the outer circumferential surface 36s of the screw main body 20p.

Accordingly, the raw materials can be prevented from locally remaining in the path 64 while extension action is continuously imparted to the raw materials passing through the path 64 thoroughly and uniformly.

Figure 21:
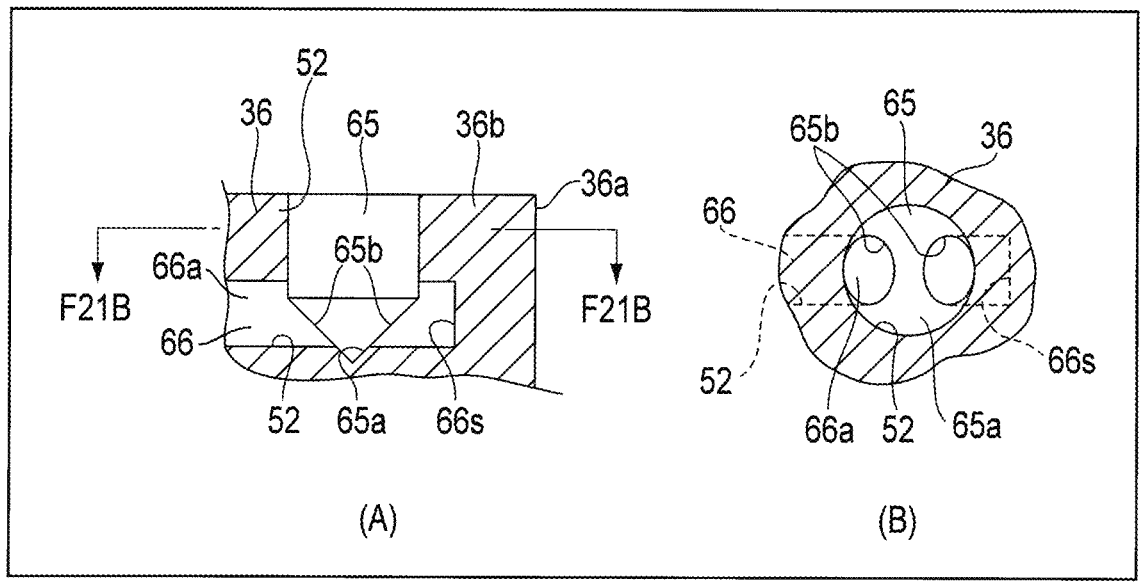
FIG. 21 (A) is an expanded sectional view showing the structure of the entrance portion of the path in a modification of the present invention, and FIG. 21 (B) is a sectional view along line F21B-F21B of FIG. 21 (A).
Figure 22:
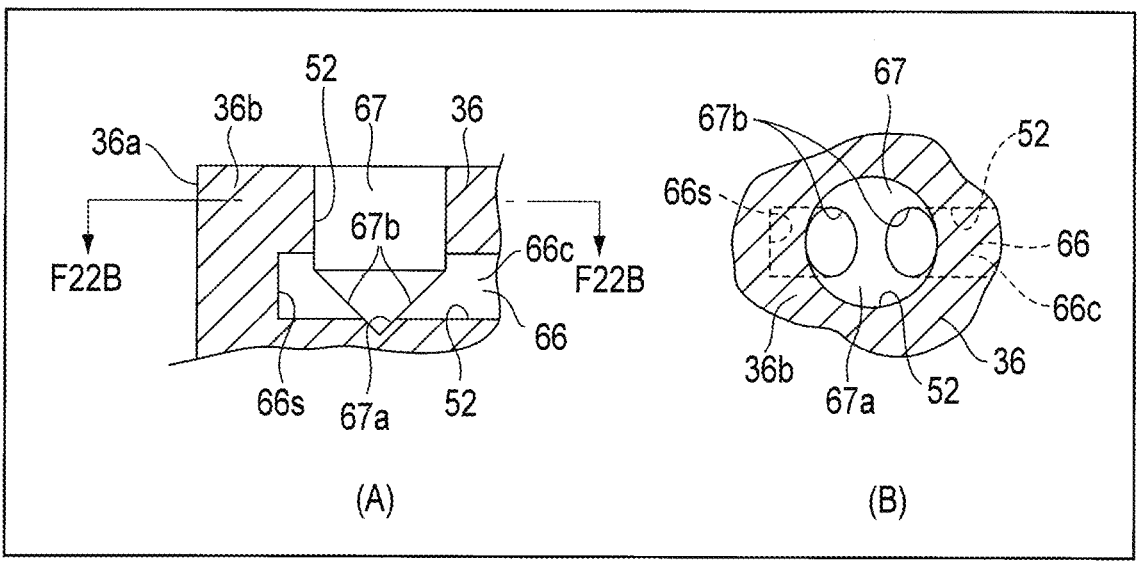
FIG. 22 (A) is an expanded sectional view showing the structure of the exit portion of the path in the modification of the present invention, and FIG. 22 (B) is a sectional view along line F22B-F22B of FIG. 22 (A).

FIGS. 21 (A) and (B) and FIGS. 22 (A) and (B) show the path 64 according to a second modification. In the path 64, a portion closer to an end face 66s on one side of the path main body 66 (the other end of the first portion 66a), that is, a portion located short of the end face 66s, is connected to the bottom portion 65a of the entrance 65. In the bottom portion 65a, two openings 65b communicating with the path main body 66 (the first portion 66a) are formed. On the other hand, a portion closer to an end face 66s on the other side of the path main body 66 (the other end of the third portion 66c), that is, a portion located short of the end face 66s, is connected to the bottom portion 67a of the exit 67. In the bottom portion 67a, two openings 67b communicating with the path main body 66 (the third portion 66c) are formed.

The two openings 65b of the entrance 65 are formed in a region facing the bottom portion 65a having a shape widening toward the outer circumferential surface 36s of the screw main body 20p. On the other hand, the two openings 67b of the exit 67 are formed in a region facing the bottom portion 67a having a shape widening toward the outer circumferential surface 36s of the screw main body 20p. The operations and advantages of the path 64 according to the second modification are the same as those of the path 64 according to the above-described first modification, and thus, description thereof is omitted.

Figure 23:
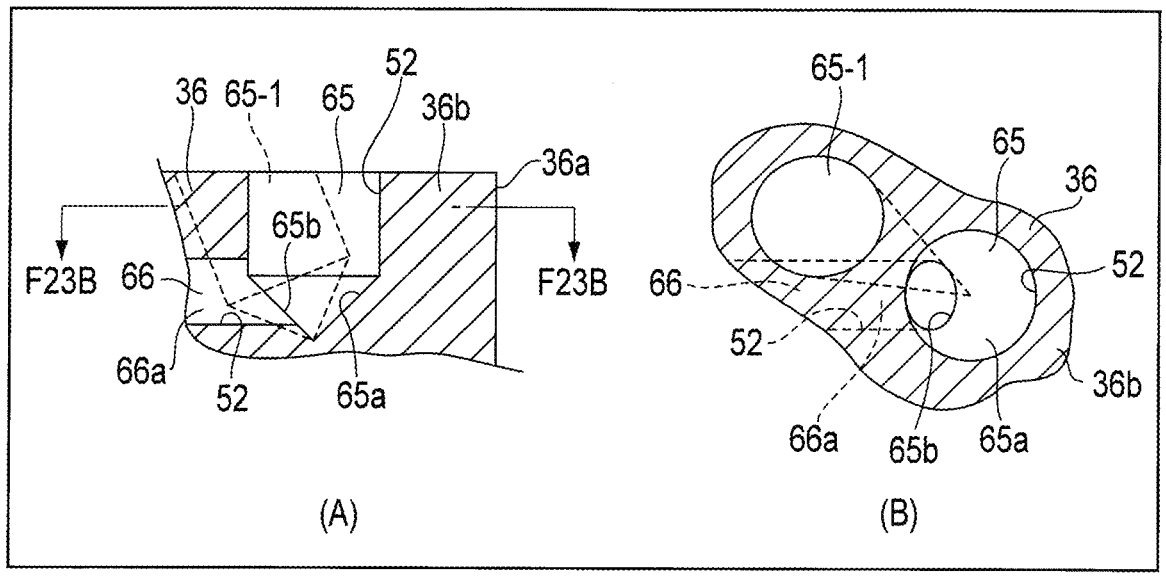
FIG. 23 (A) is an expanded sectional view showing the structure of the entrance portion of the path in a modification of the present invention, and FIG. 23 (B) is a sectional view along line F23B-F23B of FIG. 23 (A).
Figure 24:
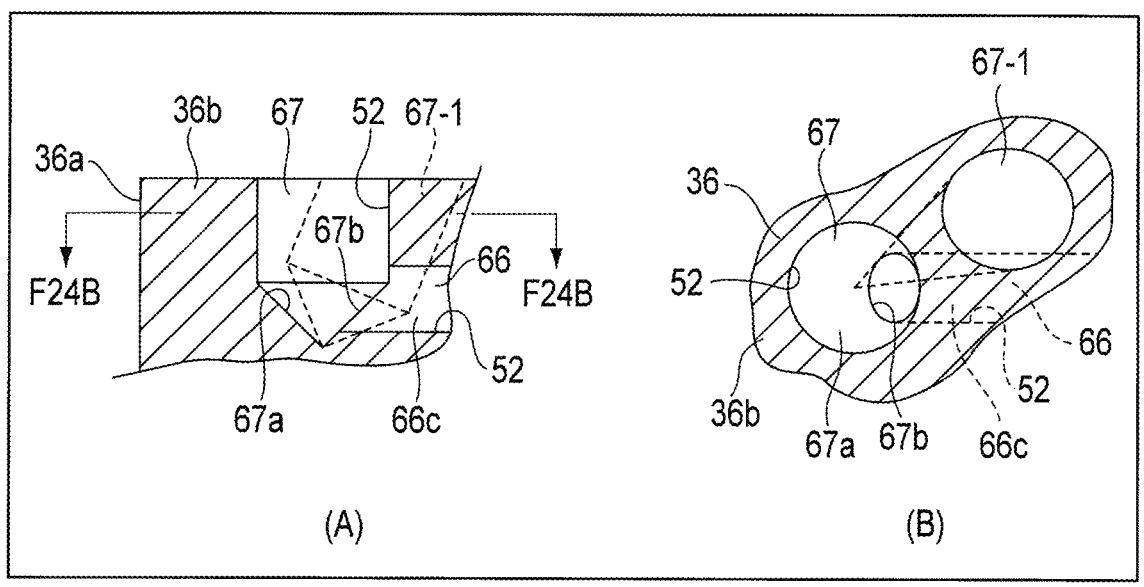
FIG. 24 (A) is an expanded sectional view showing the structure of the exit portion of the path in the modification of the present invention, and FIG. 24 (B) is a sectional view along line F24B-F24B of FIG. 24 (A).

In the above-described one embodiment and modifications, it has been assumed that the opening directions of the entrance 65 and the exit 67 are orthogonal to the axial line 41. However, the opening directions are not limited to these. For example, as shown in FIGS. 23 (A) and (B) and FIGS. 24 (A) and (B), the opening directions of the entrance 65 and the exit 67 may be set to be directions crossing the axial line 41 (directions indicated by dotted lines). In this case, entrances 65 and 65-1 and exits 67 and 67-1 may be provided by opening both sides of the path main body in directions.

Moreover, the entrance 65 is preferably formed to be further recessed than the outer circumferential surface 36s of the screw main body 20p. This enables raw materials to more easily flow into the entrance 65.

REFERENCE SIGNS LIST

20: Extruder screw
20p: Screw main body
36: Tube
37: Axis of rotation
38: Coupling portion
39: Support portion
40: Stopper portion
41: Axial line
42: Conveyance portion
43: Barrier portion
44: Discharge conveyance portion
45: Flight
46: Flight
47: Gap
48: Barrier flight
64: Path
65: Entrance
66: Path main body
67: Exit

What is claimed is:

1. An extruder screw configured to convey a raw material while kneading the raw material, comprising:
a screw main body having a straight axial line in a conveyance direction of the raw material, and configured to rotate on the straight axial line, the screw main body comprising cylindrical tubes and an axis of rotation supporting the cylindrical tubes;
conveyance portions provided with a space between the conveyance portions in an axial direction of the screw main body, and configured to convey the raw material in the axial direction along an outer circumferential surface extending in a circumferential direction of the screw main body with rotation of the screw main body;
barrier portions provided on the screw main body, and configured to limit conveyance of the raw material at positions adjacent to the conveyance portions; and
paths provided inside the screw main body, and in which of each, the material is allowed to flow,
wherein:
the conveyance portions and the barrier portions are each provided on the cylindrical tubes, and disposed along the axial direction of the screw main body, and
the paths each comprise:
an entrance opened in outer circumferential surfaces of the cylindrical tubes in the conveyance portions to cause the raw material, the conveyance of which is limited by the barrier portions to increase pressure on the raw material, to flow in,
an exit opened in the outer circumferential surfaces of the cylindrical tubes to allow the flowing raw material to flow out to the outer circumferential surface of the screw main body, and
a path main body provided inside the cylindrical tubes and connecting between the entrance and the exit,
inside one said barrier portion and inside said two conveyance portions adjacent to respective sides of the barrier portion,
the respective path is provided entirely through the barrier portion and entirely through the two conveyance portions adjacent to the respective sides of the barrier portion,
the entrance is provided in a downstream end of one of the two conveyance portions,
the exit is provided in an upstream end of another of the two conveyance portions, and
the raw material flowing into the entrance flows towards the exit in an opposite direction to a conveyance direction of the conveyance portions.

2. The extruder screw of claim 1, wherein the screw main body extends in the axial direction from a basal end coupled to a rotating device to a tip,
- each of the conveyance portions is provided with a flight spirally twisted along the outer circumferential surface of the screw main body, and
- from a perspective of a basal end side, the flight is twisted from the basal end toward the tip of the screw main body in a same direction as a rotation direction of the screw main body.

3. The extruder screw of claim 2, wherein each of the barrier portions is provided with a barrier annular body continuing in the circumferential direction along the outer circumferential surface of the screw main body, and
- the barrier annular body is formed to have a cylindrical surface concentrically continuing in the circumferential direction with the axial line as a center.

4. The extruder screw of claim 2, wherein each of the barrier portions is provided with a barrier flight spirally twisted along the outer circumferential surface of the screw main body, and
- from the perspective of the basal end side, the barrier flight is twisted from the basal end toward the tip of the screw main body in an opposite direction to the rotation direction of the screw main body.

5. The extruder screw of claim 1, wherein the screw main body extends in the axial direction from a basal end coupled to a rotating device to a tip,
- each of the conveyance portions is provided with a flight spirally twisted along the outer circumferential surface of the screw main body, and
- from a perspective of a basal end side, the flight is twisted from the basal end toward the tip of the screw main body in an opposite direction to a rotation direction of the screw main body.

6. The extruder screw of claim 5, wherein each of the barrier portions is provided with a barrier annular body continuing in the circumferential direction along the outer circumferential surface of the screw main body, and
- the barrier annular body is formed to have a cylindrical surface concentrically continuing in the circumferential direction with the axial line as a center.

7. The extruder screw of claim 5, wherein each of the barrier portions is provided with a barrier flight spirally twisted along the outer circumferential surface of the screw main body, and
- from the perspective of the basal end side, the barrier flight is twisted from the basal end toward the tip of the screw main body in a same direction as the rotation direction of the screw main body.

8. An extruder comprising the extruder screw of claim 1 and configured to knead the raw material with the extruder screw and continuously produce and extrude the kneaded material, the extruder comprising:
- a barrel comprising a cylinder in which the extruder screw is rotatably inserted;
- a supply port through which the raw material is supplied to the cylinder, the supply port being provided in the barrel; and
- a discharge port through which the kneaded material is extruded, the discharge port being provided in the barrel.

9. An extrusion method of kneading the raw material with the extruder screw of claim 1 and continuously producing and extruding the kneaded material, the extrusion method comprising:
- conveying the raw material in the axial direction by the conveyance portions of the screw main body;
- limiting the conveyance of the raw material by the barrier portions of the screw main body to increase the pressure on the raw material;
- causing the raw material, the pressure on which is increased, to flow into the paths provided inside the screw main body and flow through the paths in the opposite direction to the conveyance direction of the conveyance portions; and
- returning the raw material flowing through the paths to the outer circumferential surface of the screw main body at the position outside the conveyance portions in which the entrance is opened.

* * * * *